United States Patent
Hermann et al.

(10) Patent No.: US 12,140,234 B2
(45) Date of Patent: Nov. 12, 2024

(54) VALVE

(71) Applicants: AUROTEC GMBH, Regau (AT); NORDSON CORPORATION, Westlake, OH (US)

(72) Inventors: Helmut Hermann, Drensteinfurt (DE); Stefan Wöstmann, Sassenberg (DE); Stefan Zikeli, Regau (AT); Philipp Zauner, Vöcklabruck (AT); Michael Longin, Bad Mitterndorf (AT)

(73) Assignees: AUROTEC GMBH, Regau (AT); NORDSON CORPORATION, Westlake, OH (US)

( * ) Notice: Subject to any disclaimer, the term of this patent is extended or adjusted under 35 U.S.C. 154(b) by 188 days.

(21) Appl. No.: 17/758,685

(22) PCT Filed: Jan. 21, 2021

(86) PCT No.: PCT/EP2021/051231
§ 371 (c)(1),
(2) Date: Jul. 12, 2022

(87) PCT Pub. No.: WO2021/148487
PCT Pub. Date: Jul. 29, 2021

(65) Prior Publication Data
US 2023/0036121 A1 Feb. 2, 2023

(30) Foreign Application Priority Data
Jan. 21, 2020 (EP) ..................................... 20152892

(51) Int. Cl.
*F16K 11/078* (2006.01)
*F16K 11/085* (2006.01)
(Continued)

(52) U.S. Cl.
CPC ........ *F16K 11/078* (2013.01); *F16K 11/0853* (2013.01); *F16K 11/0856* (2013.01);
(Continued)

(58) Field of Classification Search
CPC ............... F16K 11/078; F16K 11/0853; F16K 11/0856; F16K 11/085; F16K 3/246; F16K 27/04; F16K 27/067
(Continued)

(56) References Cited

U.S. PATENT DOCUMENTS 1,428,826 A * 9/1922 Bittel .................. F16K 11/0565
251/210
2,887,072 A * 5/1959 Watkins ................. A23G 9/281
251/155
(Continued)

FOREIGN PATENT DOCUMENTS

CH            400700 A    10/1965
DE         2301883 A1    7/1974
(Continued)

OTHER PUBLICATIONS

Office Action received in Japanese Application No. 2022-544180, dated Sep. 5, 2023.
(Continued)

*Primary Examiner* — Minh Q Le
(74) *Attorney, Agent, or Firm* — Greer, Burns & Crain, Ltd

(57) ABSTRACT

A valve having a valve housing and a shut-off element, the valve housing having a cavity for receiving the shut-off element, at least one inlet opening for a fluid to flow into the cavity and at least three outlet openings for the fluid to flow out of the cavity, the shut-off element having a guide body and being arranged in a movable manner at least partially in the cavity of the valve housing, the shut-off element having
(Continued)

at least one shut-off projection for shutting off at least one of the outlet openings.

18 Claims, 18 Drawing Sheets

(51) Int. Cl.
  *F16K 3/24* (2006.01)
  *F16K 27/04* (2006.01)
  *F16K 27/06* (2006.01)
(52) U.S. Cl.
  CPC ............ *F16K 3/246* (2013.01); *F16K 11/085* (2013.01); *F16K 27/04* (2013.01); *F16K 27/067* (2013.01)
(58) Field of Classification Search
  USPC ...... 137/625, 625.17, 625.24, 625.15, 625.2; 251/310, 88
  See application file for complete search history.

(56) References Cited

U.S. PATENT DOCUMENTS

| | | | | |
|---|---|---|---|---|
| 3,099,430 A * | 7/1963 | Jacobsen | ................... | F16K 1/54 251/146 |
| 3,233,630 A * | 2/1966 | Strand | ..................... | F16K 11/08 137/625.47 |
| 3,746,481 A | 7/1973 | Schippers | | |
| 3,783,900 A * | 1/1974 | Waldbillig | .......... | F16K 11/0853 251/309 |
| 3,815,871 A * | 6/1974 | Carlson | ................ | F16K 5/0414 251/310 |
| 3,817,668 A | 6/1974 | Mayer et al. | | |
| 3,957,082 A * | 5/1976 | Fuson | ................ | A61M 39/223 604/80 |
| 4,011,889 A * | 3/1977 | Smith | .................... | F16K 3/246 137/630.19 |
| 4,146,055 A * | 3/1979 | Ryder | ................... | F16K 11/085 251/312 |
| 4,213,747 A | 7/1980 | Friedrich | | |
| 4,262,880 A | 4/1981 | Danko et al. | | |
| 4,330,011 A | 5/1982 | Moen | | |
| 4,699,358 A * | 10/1987 | Iqbal | ..................... | F16K 47/045 251/117 |
| 4,854,545 A * | 8/1989 | Pezzarossi | ............ | F16K 5/0471 137/454.6 |
| 4,984,977 A | 1/1991 | Grimminger et al. | | |
| 5,095,950 A * | 3/1992 | Hallberg | .............. | G05D 11/003 137/88 |
| 9,605,765 B1 * | 3/2017 | Cheng | ................... | F16K 11/076 |
| 10,677,140 B1 * | 6/2020 | Kaczmar | ................ | F02M 26/51 |
| 10,865,668 B2 * | 12/2020 | Wong | ........................ | F01L 7/02 |
| 11,492,965 B1 * | 11/2022 | Krejci | ................... | F02B 37/183 |
| 2014/0076454 A1 * | 3/2014 | Kjar | .......................... | B65B 3/28 141/83 |
| 2014/0346386 A1 * | 11/2014 | Tornblom | ........... | A61M 39/223 137/625.19 |
| 2019/0242298 A1 * | 8/2019 | Zatko | ..................... | F02M 26/43 |
| 2020/0173347 A1 * | 6/2020 | Daniels | ............... | F16K 11/0853 |
| 2021/0080016 A1 * | 3/2021 | Wong | ..................... | F16K 11/085 |
| 2022/0186877 A1 * | 6/2022 | Cotton | ................... | F16N 25/04 |

FOREIGN PATENT DOCUMENTS

| | | |
|---|---|---|
| DE | 3122452 A1 | 3/1982 |
| DE | 102005037268 A1 | 2/2006 |
| DE | 102007047726 A1 | 4/2009 |
| JP | H8-093933 A | 4/1996 |
| WO | 03029329 A2 | 4/2003 |
| WO | 2006000197 | 1/2006 |

OTHER PUBLICATIONS

European Search Report received for Application No. 20152892.4, dated Jul. 13, 2020.
International Search Report and Written Opinion received for PCT/EP2021/051231, mailed Mar. 3, 2021.
International Preliminary Examination Report received for PCT/EP2021/051231, dated May 20, 2022.
Fernandez, J., et al., "Recovery of Ionic Liquids from Wastewater by Nanofiltration," J Membra Sci Techn, Special Issue 4, 2011, 8 pages.
Hauru, L., et al., "Dry jet-wet spinning of strong cellulose filaments form ionic liquid solution," Cellulose 21, 2014, pp. 4471-4481.
Liu, Y., et al., "Low energy recycling of ionic liquids via freeze crystallization during cellulose spinning,"Green Chemistry, vol. 20, No. 2., 2018, pp. 493-501.
Parviainen, A., et al., "Sustainability of cellulose dissolution and regeneration in 1,5-diazabicyclo[4.3.0]non-5-enium acetate: a batch simulation of the IONCELLF-process," RSC Adv 5, 2015, pp. 69728-69737.
International Preliminary Report on Patentability received for PCT/EP2021/051231, dated May 20, 2022.
First Office Action received in Chinese Application No. 202180022750.7, dated May 14, 2024.

* cited by examiner

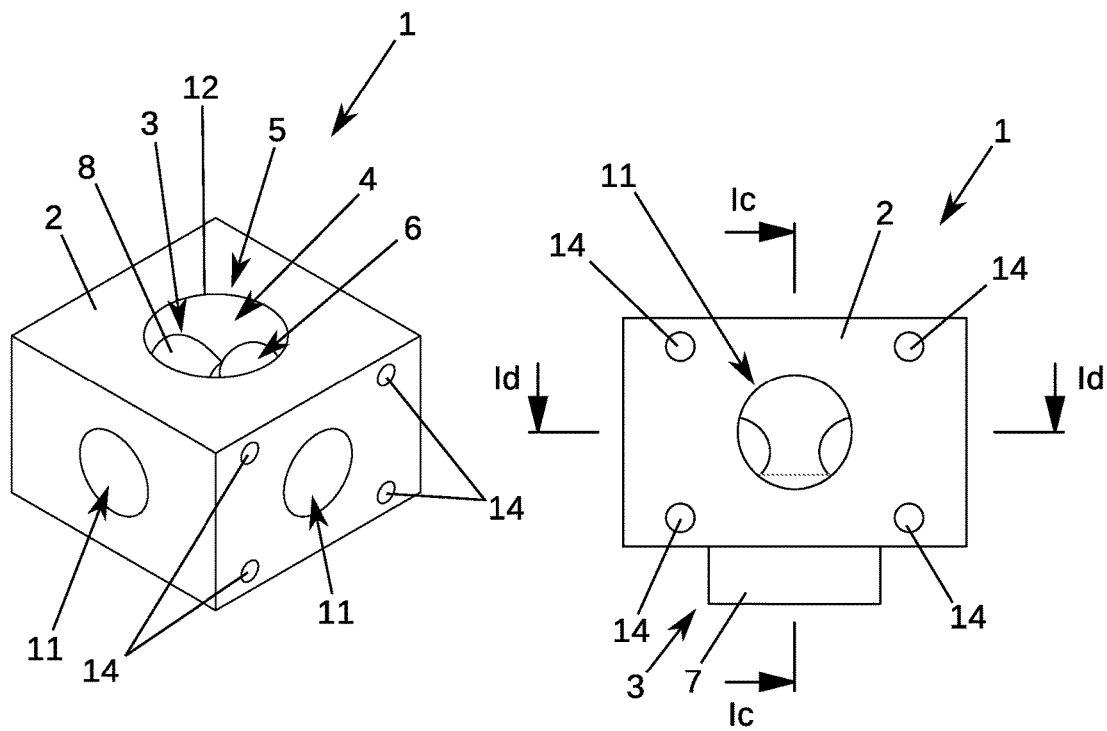
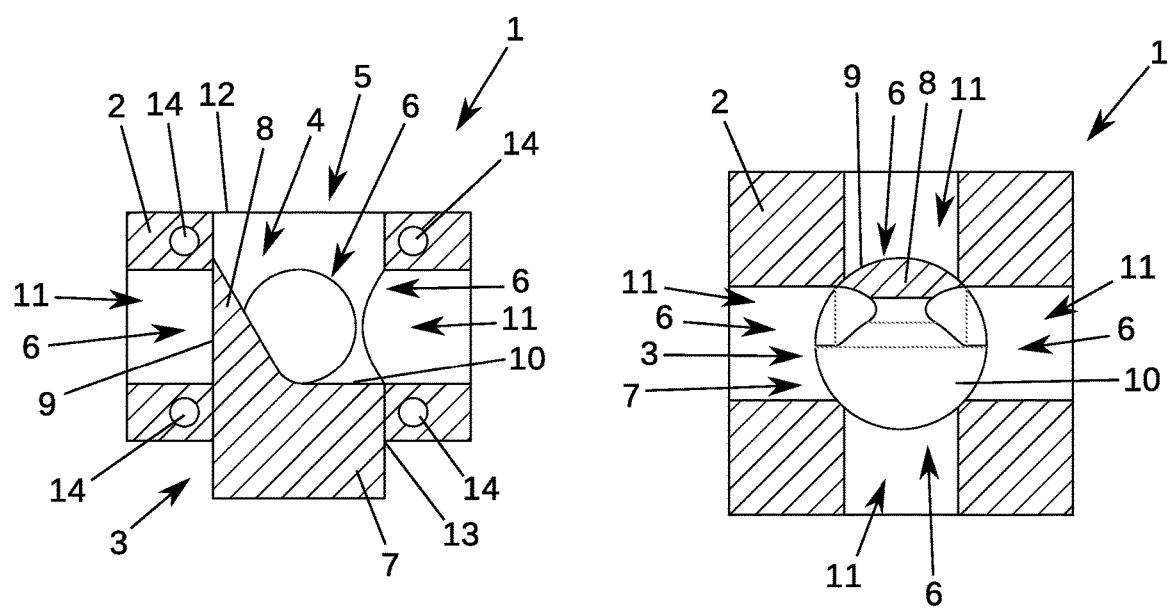
Fig. 1a Fig. 1b Fig. 1c Fig. 1d

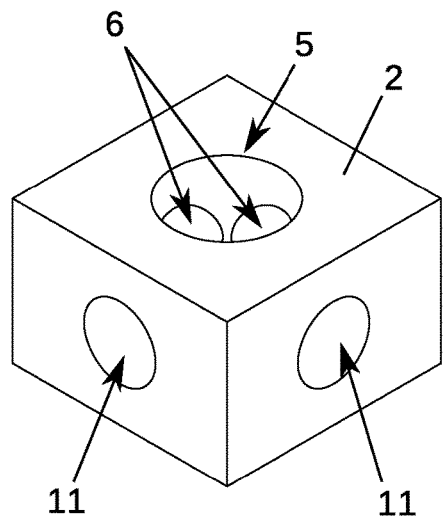
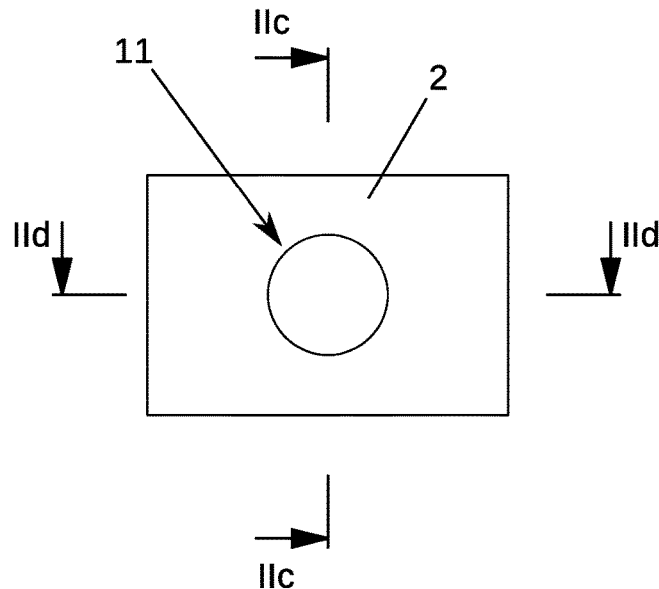
Fig. 2a Fig. 2b
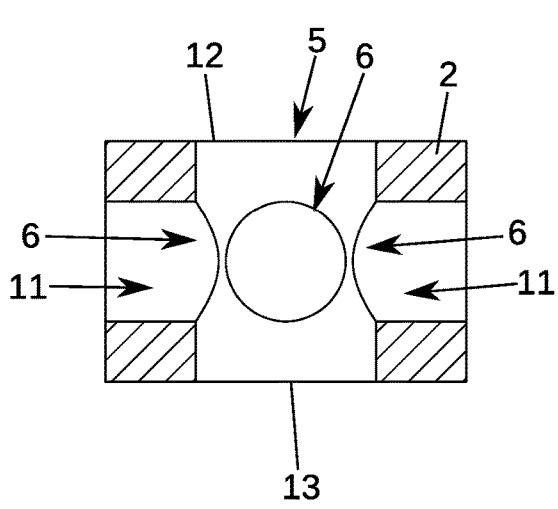
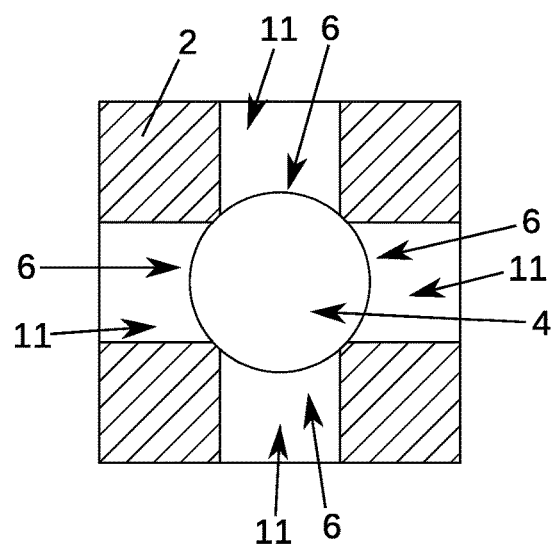
Fig. 2c Fig. 2d

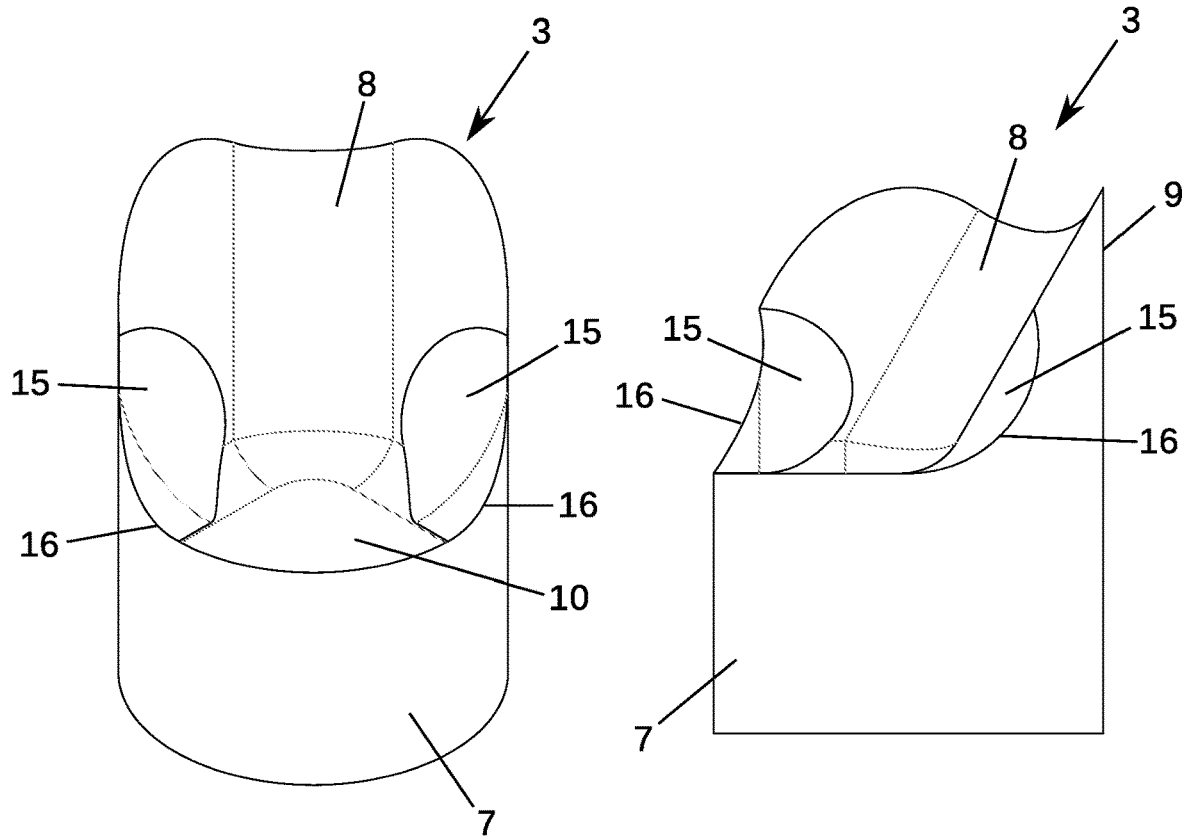
Fig. 5a                    Fig. 5b
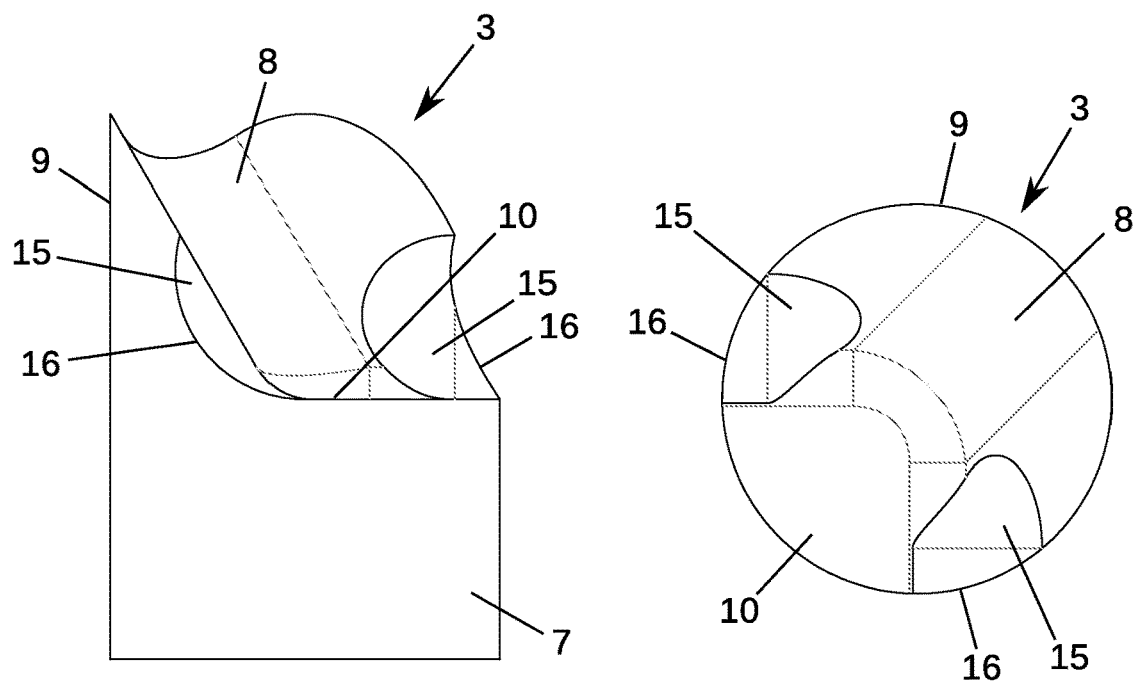
Fig. 5c                    Fig. 5d

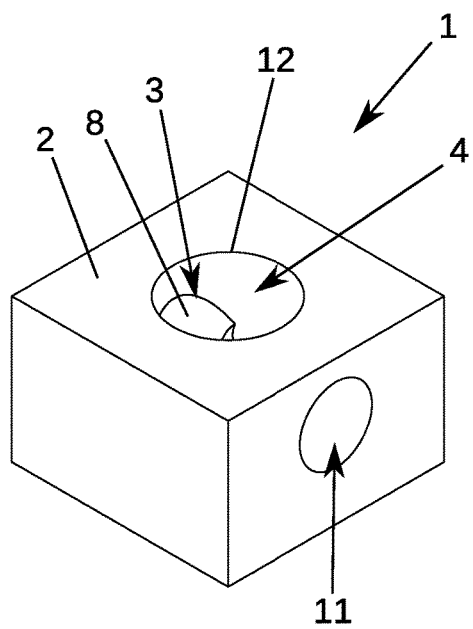
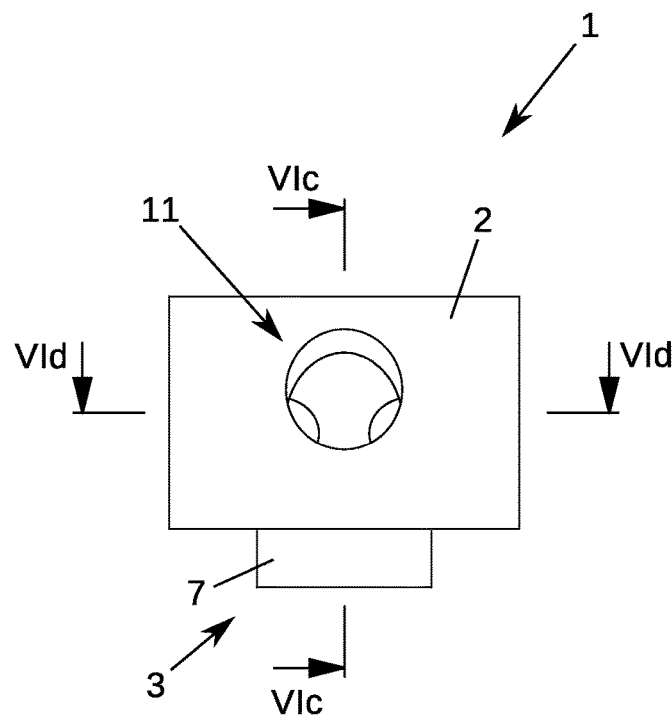
Fig. 6a
Fig. 6b
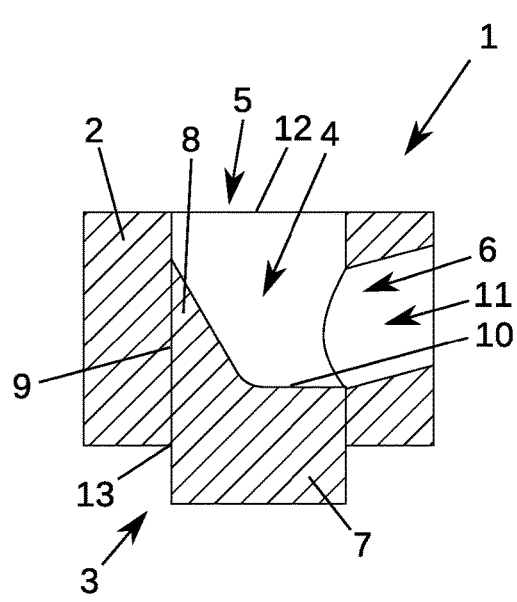
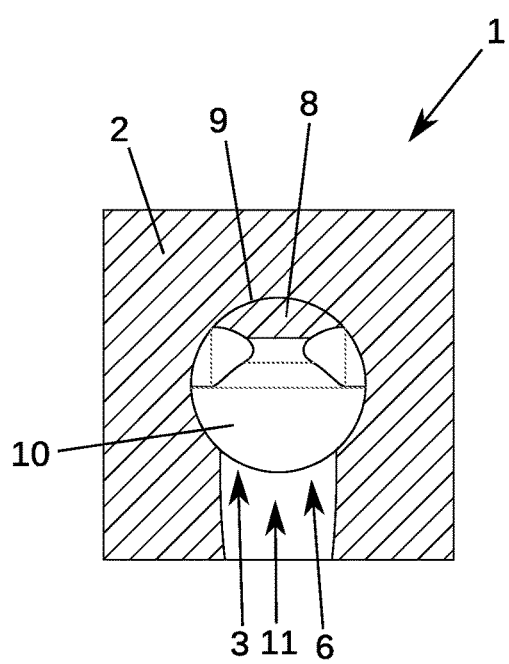
Fig. 6c
Fig. 6d

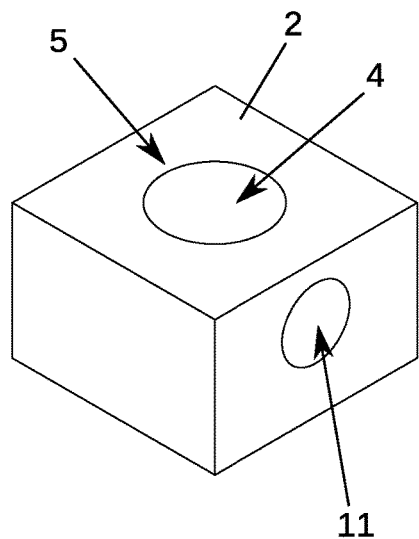
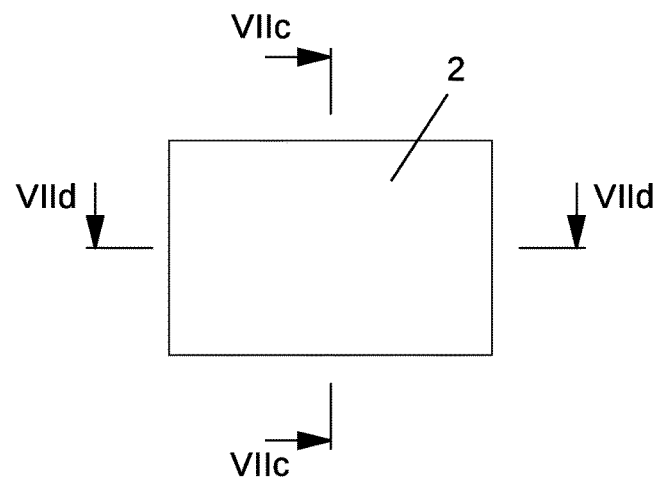
Fig. 7a
Fig. 7b
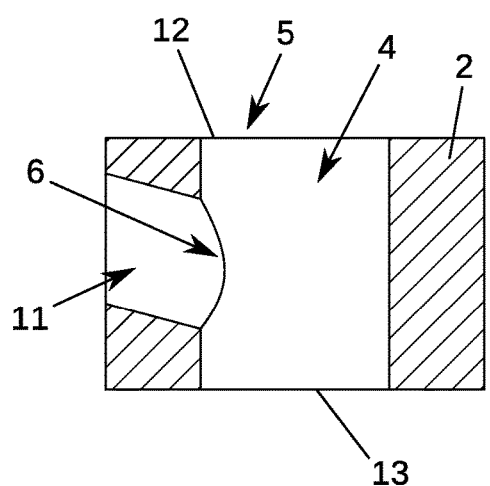
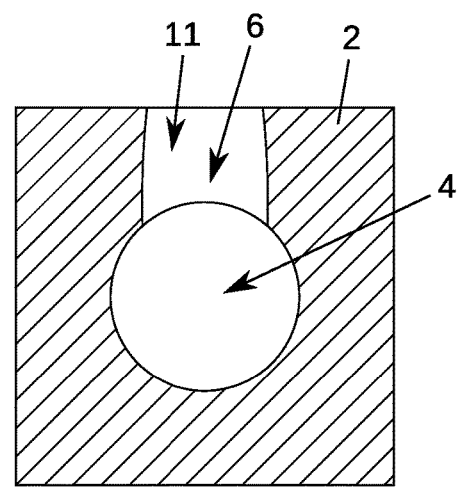
Fig. 7c
Fig. 7d

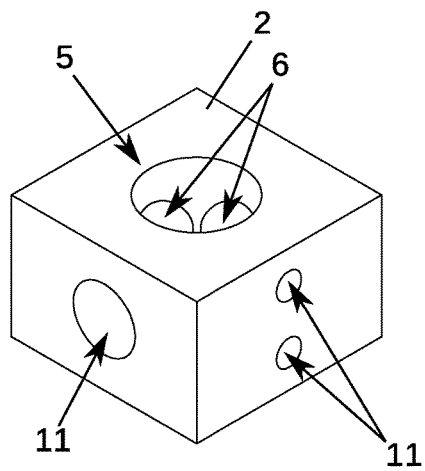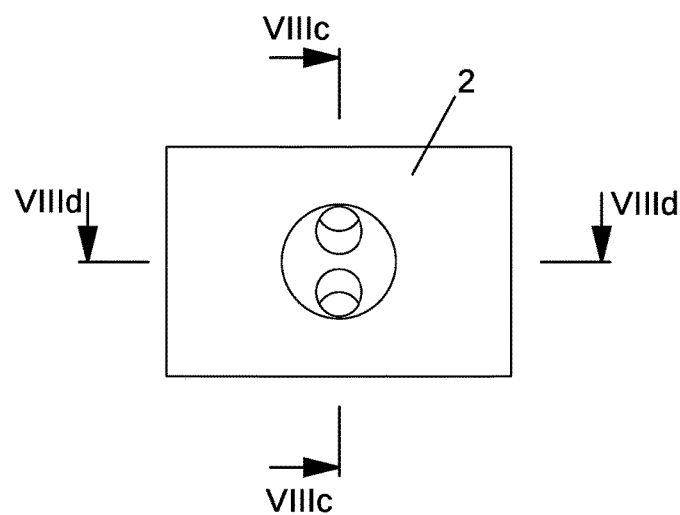
Fig. 8a　　　　　　　　　　Fig. 8b
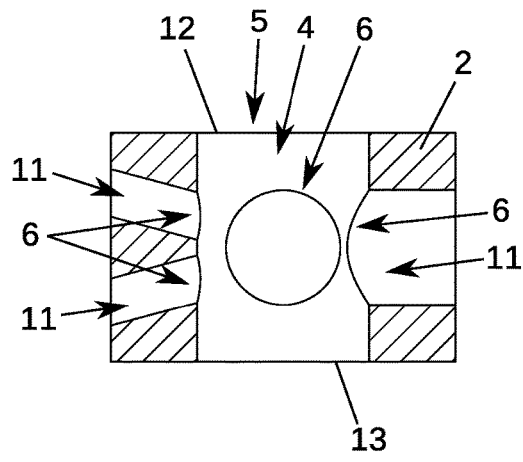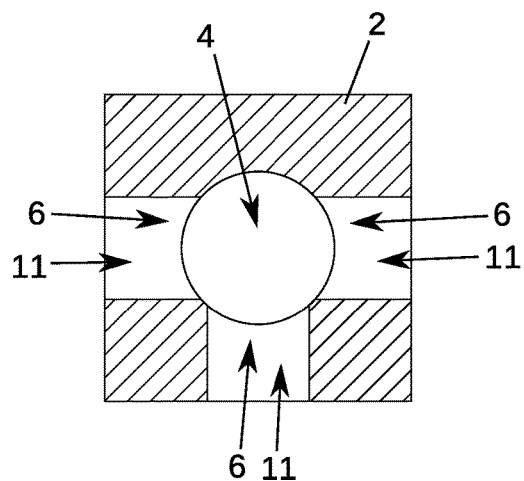
Fig. 8c　　　　　　　　　　Fig. 8d

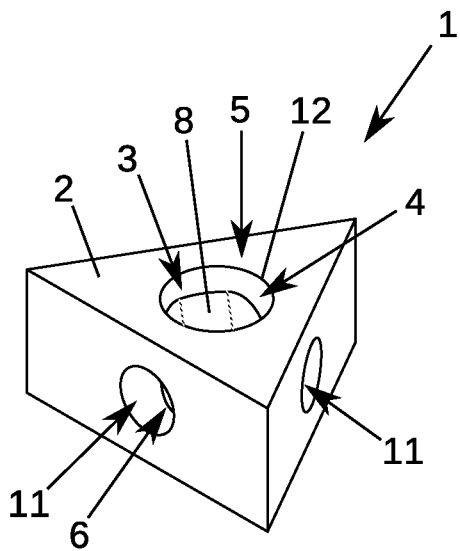 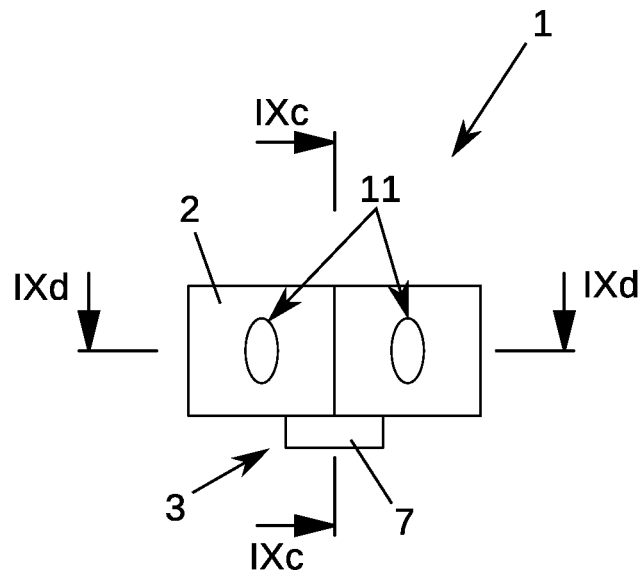
Fig. 9a  Fig. 9b
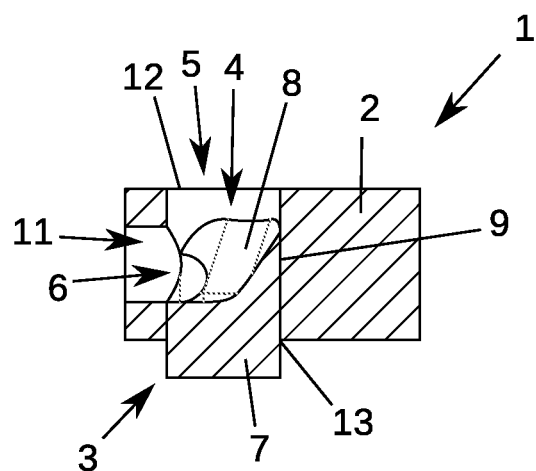 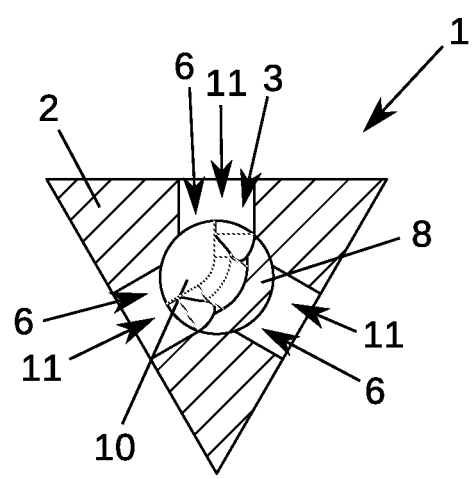
Fig. 9c  Fig. 9d

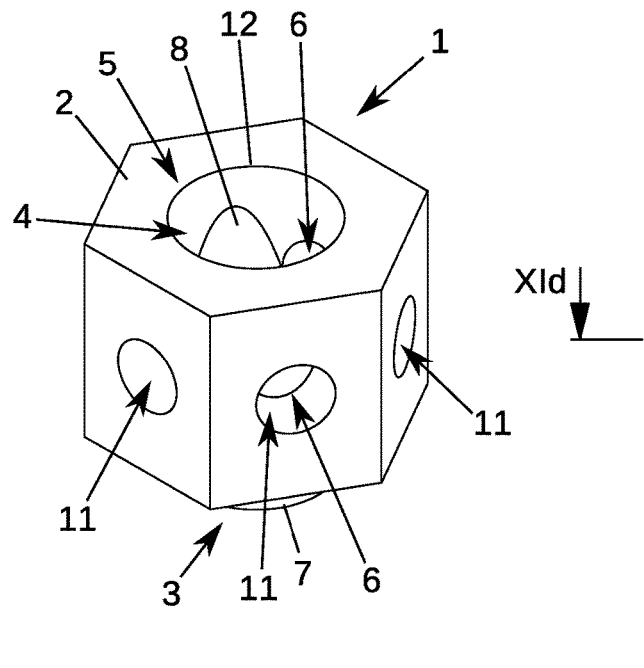
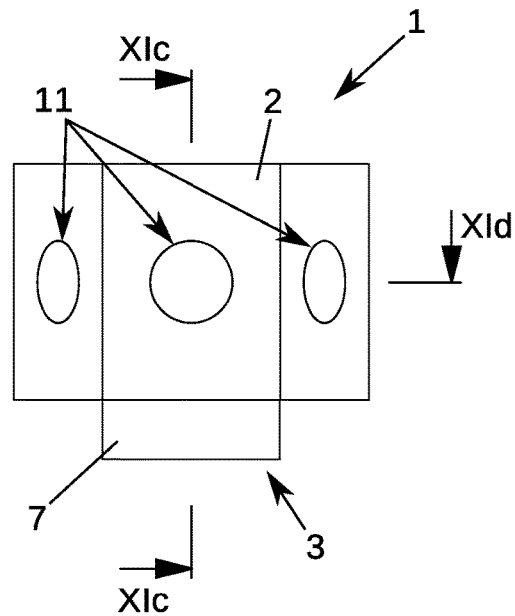
Fig. 11a
Fig. 11b
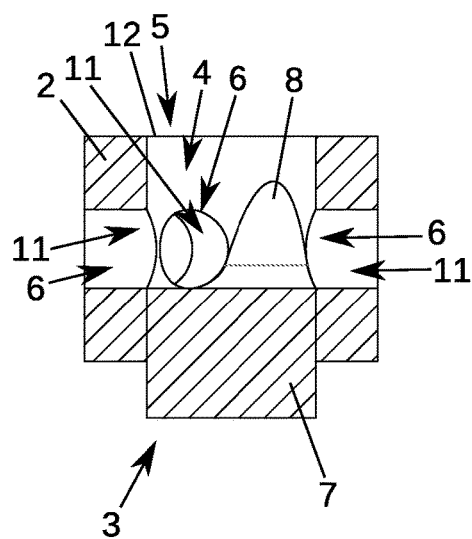
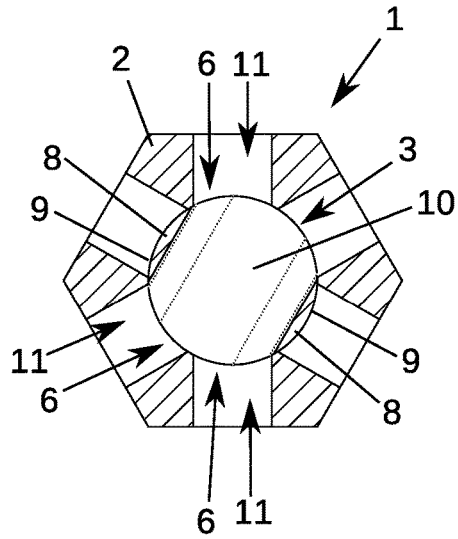
Fig. 11c
Fig. 11d

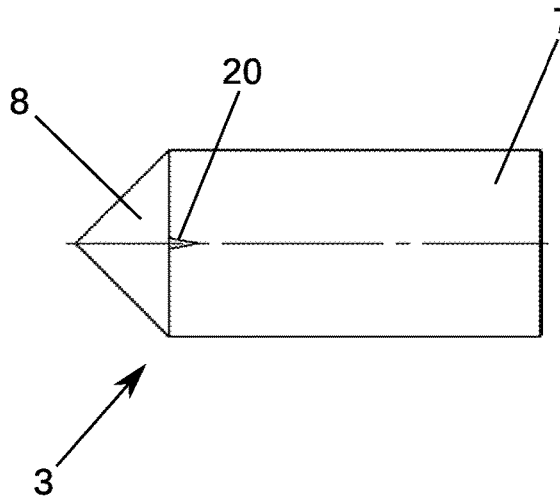
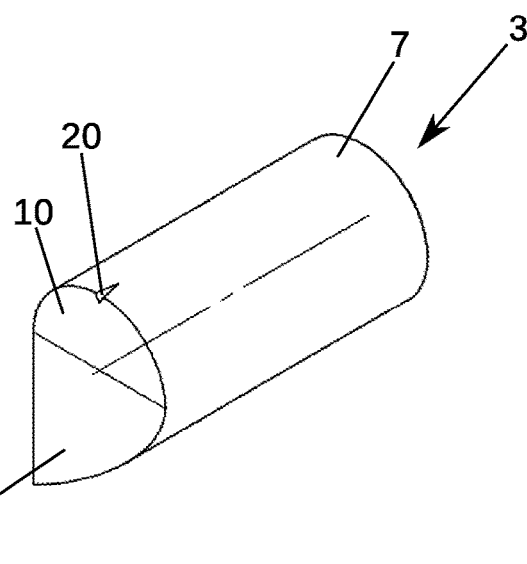
Fig. 18a  Fig. 18b
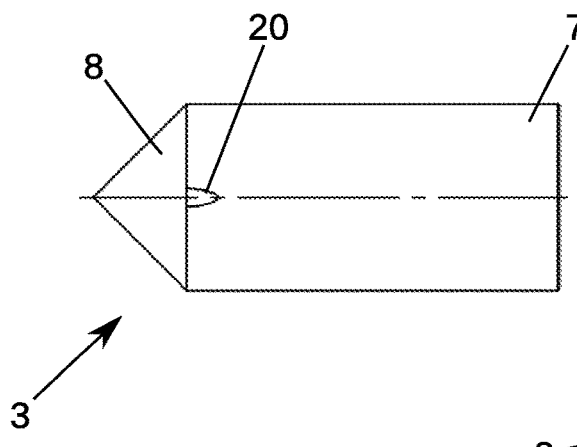
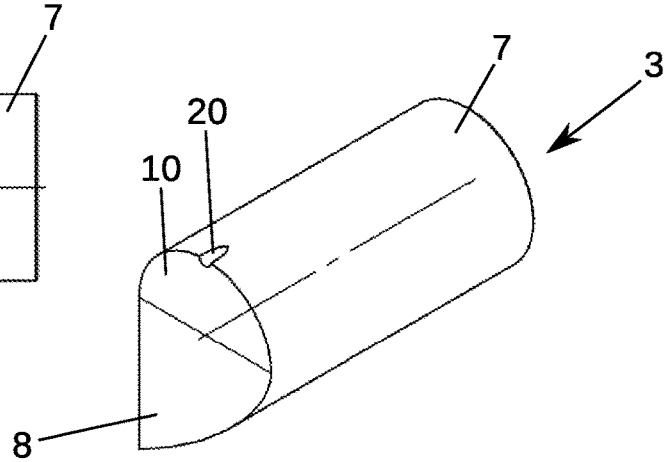
Fig. 19a  Fig. 19b

VALVE

BACKGROUND

The invention relates to a valve comprising a valve housing and a shut-off element, wherein the valve housing comprises a cavity for receiving the shut-off element, at least one inlet opening for a fluid to flow into the cavity and one or more outlet openings for the fluid to flow out of the cavity, wherein the shut-off element comprises a guide body and is arranged linearly movably at least partially in the cavity of the valve housing between the inlet opening and the outlet opening. The invention further relates to a method for transporting fluids.

In many technical manufacturing processes it is desirable to operate on a continuous flow basis with constantly full and/or partially filled material feed lines. An example for this is the manufacture of formed cellulose products such as fibres, foils, films from the renewable raw material cellulose. In this manufacturing process formed cellulose articles are manufactured by forming cellulose solutions in an organic solvent and by spinning the cellulose/solution melts for forming a fibre or a film. A preferred form of the solvent is a tertiary amine-N-oxide, typically N-methyl morpholine N-oxide (NMMO). These cellulose solutions are usually highly viscous, having a viscosity of typically 50,000 to 100,000,000 mPas. Such a cellulose solution manufacturing process is described in EP 0 356 419 B1. A problem with the processing of cellulose solutions is the high processing temperature required (usually 80° C. to 130° C.) and the instability of the cellulose solution at these temperatures. It is therefore desirable to operate free of dead space and free from stagnation.

Various forms of valves are known in the prior art. DE 38 15 897 C2 discloses a starting valve throttle unit with a discharge channel which widens to an extrusion tool. Provided in the housing of the starting valve throttle unit is a guide and starting bore in which a starting valve and throttle body is arranged displaceably and rotatably in the direction of its longitudinal axis transversely to the axis of the discharge channel. The starting and throttle body has two closure sections between which a throttle body is arranged. On an inner closure section a starting valve body is formed on the side facing away from the throttle body. This should seal, on the one hand, and leave free on the other hand a starting outlet opening in the bore, which leads outwards from the valve throttle housing. Further valves are known, for example, from DE 2751225, DE 102007047726 and DE 102005037268.

Further, U.S. Pat. Nos. 3,817,668 and 3,746,481 describe melt pumps which use gear wheels as means for controlling the fluid flow. However, these have not proved suitable for the introduction, distribution, control of the flux of hot liquids, in particular hot plastic liquid melts and cannot be used as switching and/or deflecting distributor valves.

The object of the present invention consists in ameliorating or eliminating at least individual disadvantages of the prior art. The invention in particular has the aim of providing a valve and a method for transporting fluid in which fluid flows are improved and in which the outlet opening can be selectively shut off.

SUMMARY

This object is achieved by a valve as specified initially, wherein the shut-off element comprises at least one shut-off projection for shutting off at least one of the outlet openings.

The object is further achieved by a method for transporting fluids, therein a fluid flow is regulated and/or controlled in a valve according to the invention.

Accordingly, the shut-off element of the valve comprises at least one shut-off projection for shutting off at least one of the outlet openings. A fluid can flow into the cavity of the valve housing via an inlet opening which is delimited by the valve housing. The shut-off element is at least partially arranged in the cavity, wherein the shut-off element is movable with respect to the valve housing of the valve. The at least one shut-off projection of the shut-off element is configured in such a manner that this at least partially shuts off at least one outlet opening. As a result, depending on the position of the shut-off element the fluid cannot flow out from the valve via the shut-off outlet openings or can only flow out to a limited extent or can flow out completely unhindered. By moving the shut-off element in the cavity, the shut-off of at least one outlet opening can be regulated with the aid of the at least one shut-off projection so that the outlet opening to be shut off is shut off variably between 0 and 100%. As a result, a continuous regulation of the fluid flowing through the outlet openings is possible. Preferably in a position in which one outlet opening is completely shut off, at least two other outlet openings are completely open.

The shut-off projection of the shut-off element preferably has the form of a tongue. In this case, the shut-off projection is configured in such a manner that the fluid flow through the tongue shape of the shut-off projection can be controlled whereby fluid flows to the shut-off projection and from this is deflected in the direction of at least one open outlet opening. By this means the fluid can be conveyed to at least one open outlet opening, in particular at least two open outlet openings, and can be prevented from escaping through the at least one outlet opening shut off by the shut-off projection. A further possibility for operation is to configure a valve with only one feed and one drain in a tongue shape so that shut-off can be carried out free from dead space. By this means it is possible to control the fluid flowing through the outlet openings. Advantageously the shut-off projection is formed in such a manner that in at least one position in which a first one of the outlet openings is shut off by the shut-off projection and the inlet opening and a second of the outlet openings are open for the flow of a fluid, one edge of the shut-off projection at least partially follows a circumference of a second of the outlet openings. Preferably the shut-off projection is formed in such a manner that in at least one position of the shut-off projection in which one of the outlet openings is shut off, at least two of the outlet openings are open, in particular completely open.

Alternatively or additionally, the shut-off projection should be equated to a flow-through recess which allows a flow of fluid between the at least one inlet opening and the outlet openings not shut off by the at least one shut-off projection. In this case, the flow-through recess is a recess in the shut-off element which is connected via the cavity to at least one inlet opening and at least one outlet opening, preferably at least two outlet openings in such a manner that fluid can flow from at least one inlet opening via the flow-through recess to at least one outlet opening, preferably at least two outlet openings.

Preferably the outlet openings and advantageously the inlet opening delimit the in particular prism-shaped lateral surface of the cavity.

The valve according to the invention can be used for the dead-space-free feeding, removal, switching and/or conveyance limitation of highly viscous liquids and/or melts. As a result of the special configuration of the shut-off element, the valve can be used for highly viscous liquids and melts in the area of partially crystalline high-performance thermoplastics such as PEK (polyether ketone), PPEK (polyphthalazine ether ketone), PPS (polyphenylene sulfide) or amorphous high-performance thermoplastics such as PAI (polyamide imide), PPSU (polyphenyl sulfone), PSU (polysulfone) or PES (polyether sulfone) in the corresponding manufacturing processes. The valve according to the invention can also be used in the manufacturing processes of partially crystalline and amorphous thermoplastics such as PA (polyamide), PA6 (polyamide 6; polyamide from caprolactam), PA66 (polyamide 66; polyamide from hexamethylene diamine), PBT (polybutylene terephthalate), POM (polyoxymethylene), PET (polyethylene terephthalate), PP (polypropylene), PE (polyethylene), PTFE (polytetrafluoroethylene). Such methods and manufacturing processes typically comprise extrusion, injection moulding, blow moulding, coating and spray techniques such as, for example, the manufacture of synthetic textile fibres, plastic hoses, plastic foils and films as well as protective and/or insulating coatings for electrical conductor wires.

Preferably the valve according to the invention is used in the manufacture of cellulose or in lines for transporting cellulose solutions. Particularly preferably the valve according to the invention is used in transporting cellulose solutions which are used as extrusion media for the moulding process. In this case, the cellulose concentration is selected in usual sizes for Lyocell processes. The cellulose concentration in the cellulose solution can thus be 4% to 23%, preferably 6% to 20%, in particular 8% to 18% or 10% to 16% (all % information is in mass %).

Preferably the solvent of the cellulose solution is a tertiary aminoxide (amine-N-oxide), particularly preferably N-methylmorpholine N-oxide. Alternatively or additionally it can be an ionic solvent. Such ionic solvents are described, for example, in WO 03/029329; WO 2006/000197 A1; Parviainen et al., RSC Adv., 2015, 5, 69728-69737; Liu et al., Green Chem. 2017, DOI: 10.1039/c7gc02880f; Hauru et al., Cellulose (2014) 21:4471-4481; Fernández et al. J Membra Sci Technol 2011, p:4; etc. and preferably contain organic cations such as, for example, ammonium, pyrimidium or imidazolium cations, preferably 1,3-dialkyl imidazolium salts such as halides. Water is also used here, preferably as non-solvent of cellulose. Particularly preferred is a solution of cellulose and butyl-3-methyl imidazolium (BMIM), e.g. with chloride as counterion (BMIMCl), or 1-ethyl-3-methyl-imidazolium (also preferably as chloride, acetate or diethyl phosphate) or 1-hexyl-3-methylimidazolium or 1-hexyl-1-methylpyrrolidinium (preferably with a bis(trifluoromethyl sulfonyl)amide anion), and water. Further ionic solvents are 1,5-diazabicyclo[4.3.0]non-5-enium, preferably as acetate; 1-ethyl-3-methylimidazolium acetate, 1,3-dimethylimidazolium acetate, 1-ethyl-3-methylimidazolium chloride, 1-butyl3-methylimidazolium acetate, 1-ethyl-3-methylimidazolium diethyl phosphate, 1-methyl-3-methylimidazolium dimethyl phosphate, 1-ethyl-3-methylimidazolium formate, 1-ethyl-3-methylimidazolium octanoate, 1,3-dimethylimidazolium acetate and 1-ethyl-3-methylimidazolium propionate.

It is advantageous if the guide body has a groove running in the longitudinal direction of the guide body and/or that the valve housing has a groove running from an outlet opening in the direction of the inlet opening. In particular, the groove runs in the direction of displacement of the guide body. Via this groove a relief of pressure can be achieved when starting up.

It is preferable if the shut-off projection is arranged on a base surface of the guide body and if the groove runs to the base surface.

In a preferred embodiment, the groove has a cross-section which increases continuously in the longitudinal direction of the guide body in the direction of the shut-off projection or which decreases continuously from the one outlet opening in the direction of the inlet opening. By this means a gentler relief of pressure is achieved.

It is advantageous if at least two, preferably at least three outlet openings are provided, wherein the outlet openings are arranged in particular in a plane perpendicular to the longitudinal axis of the cavity.

According to a preferred embodiment, the shut-off projection has a curved abutting surface for abutting against at least one of the outlet openings. Advantageously the abutting surface has the same curvature as at least one of the outlet openings so that the abutting surface can abut substantially tightly against the curved outlet opening in order to cover the outlet opening and thus shut this off. Particularly preferably the curved abutting surface is simply curved with a constant radius of curvature so that during a rotation of the shut-off element the abutting surface is moved past the outlet opening at a constant distance (in particular in an abutting manner). An exemplary curvature of an outlet opening for example follows due to a recess from a limiting wall of the cavity which, for example, can be a cylinder.

In order to move the shut-off element in the cavity, it is favourable if the valve has a drive for moving, in particular for rotating and/or linear movement of the shut-off element. As a result, an automatic movement of the shut-off element is possible. Advantageously the shut-off element is moved continuously with the aid of the drive in order to continuously shut off at least one of the outlet openings. Advantageously the shut-off element can be brought by means of the drive into at least one position in each case in which an outlet opening is shut off (in particular completely).

According to a preferred embodiment, the guide body of the shut-off element is substantially cylindrical, wherein the at least one shut-off projection is arranged on a base surface of the substantially cylindrical guide body. In this case, the shut-off projection extends in the direction of the longitudinal axis of the guide body. Advantageously the shut-off element can be rotated in the cavity of the valve housing. As a result of the rotation of the shut-off element, the shut-off projection can be moved (rotated) radially in the cavity so that the shut-off projection can be moved to at least one of the outlet openings and thus cover and shut off this and due to the rotational movement can move away from the outlet opening and can thereby release and open thus. Advantageously the shut-off element can be brought into at least one position per outlet opening in which the respective outlet opening is shut off.

According to a particularly preferred embodiment, the cavity is cylindrical, wherein the longitudinal axis of the cylindrical cavity coincides with the longitudinal axis of the substantially cylindrical guide body of the shut-off element. As a result, an optimal receipt of the shut-off element in the cavity of the valve housing is possible.

According to a particularly preferred embodiment, the shut-off element in the cavity has a tolerance so that a gap is formed in the cavity between the guide body of the shut-off element and the valve housing through which fluid can flow. As a result, a permanent deposition of fluid in the valve can be reduced or even avoided. Through the gap a defined fluid flow can flow around the guide body of the shut-off element so that no dead space in which fluid can be deposited is formed in the cavity. As a result of the freedom from dead space, long dwell times of the fluid in the valve according to the invention are prevented. Advantageously the shut-off projection is configured in such a manner that this does not form any dead space during flow and deflection of a fluid and enables an optimal conveyance of the fluid.

According to a further particularly preferred embodiment, a seal is arranged between the guide body of the shut-off element and the cavity which seals the shut-off element with respect to the valve housing. This has the advantage that a complete sealing of the shut-off element is possible.

For simple connection of the valve to pipelines, it is favourable if the valve housing has one or more further cavities which are connected to the cavities via respectively one of the outlet openings. In this case, the one or more outlet openings are openings which are arranged on one or more inner surfaces of the valve housing which adjoin the cavity. Thus, the outlet openings are arranged directly on the cavity. As a result, a fluid flowing into the cavity via the at least one inlet opening can flow out via the outlet openings not shut off by the shut-off projection and be distributed over these so that the valve according to the invention can preferably be used as a distributor valve. According to a preferred embodiment the one or more further cavities are cylindrical. The one shut-off projection or the shut-off projections block one or more outlet openings partially or completely. By displacement of the shut-off projections, other outlet openings can be blocked (e.g. by rotational movement) so that a different distribution of the fluid flowing through the cavity to other outlet openings is possible—even without interrupting the fluid flow through the inlet during operation.

It is furthermore favourable if one inlet opening is arranged on a base surface of the cylindrical cavity, in particular is congruent with a base surface of the cylindrical cavity (wherein preferably at least one, particularly preferably at least two, even more preferably at least three of the outlet openings are arranged on a lateral surface of the cavity projecting from the base surface). In this case, the inlet opening is preferably arranged in the longitudinal direction of the substantially cylindrical guide body of the shut-off element. Preferably the shut-off element is arranged in the cavity in such a manner that the at least one shut-off projection is arranged on the base surface of the guide body facing the inlet opening. As a result, the fluid can flow better from the inlet opening into the cavity.

According to a preferred embodiment, the cavity is a cylindrical bore passing through the valve housing wherein the bore forms a first and a second aperture on two opposite sides of the valve housing. As a result, the valve housing can be manufactured simply and inexpensively by producing the cavity through a bore. The shut-off element can thus be simply arranged in the cavity of the valve housing and can be removed from the cavity again for maintenance purposes.

According to a particularly preferred embodiment, the first aperture forms an inlet opening. As a result, the fluid can flow into the cavity via the inlet opening via the first aperture and then be distributed with the aid of the shut-off element.

For better guidance of the shut-off element in the cavity, the diameter of the bore is equal to the diameter of the substantially cylindrical guide body of the shut-off element and the substantially cylindrical guide body of the shut-off element is at least partially received in the bore in such a manner that the shut-off element projects at least partially from the second aperture. Alternatively the guide body can also be flush with the second aperture and have a corresponding receiving device for movement in the interior of the guide body.

It is further favourable if the drive is for rotation of the shut-off element about the longitudinal axis of the substantially cylindrical guide body wherein the drive engages at an end of the shut-off element projecting from the second aperture. By this means the shut-off element can be arranged in a space-saving manner partially in the cavity of the valve housing.

It is possible if, in the region of the second aperture, in which the guide body projects from the valve housing, sealing rings, preferably leakage rings are mounted in a groove milled into the guide body. These sealing rings are preferably constructed of a flexible plastic ring which is resistant to the fluid and from a cover ring. Particularly preferably the sealing rings are arranged on the valve housing in the second section of the cavity at the second aperture so that these seal the gap in the cavity between the valve housing and the guide body of the shut-off element against fluid leakage.

It is possible to construct the gap between valve housing and guide body so that without using a seal due to a selected fit, the gap has a specific leakage flow of fluid medium. As a result, any permanent depositions of medium in the gap are prevented and a freedom from dead space is produced.

Depending on the viscosity of the fluid transported in the valve, there can be scenarios in which the quantity of fluid which emerges from the valve housing through the gap in the cavity between the valve housing and the guide body is too large. Particularly preferably in this case sealing rings can be used and these can be made to bulge inwards in the cavity in the direction of the guide body by tightening fastening screws which fasten the sealing rings on the valve housing so that the fluid flow in the gap in the cavity between the guide body and the valve housing is reduced. By this means the leakage flow can be set to a desired amount.

According to a preferred embodiment, the valve housing has at least two outlet openings and the at least two outlet openings are arranged in a plane perpendicular to the longitudinal axis of the cavity. Advantageously outlet openings can thereby be shut off by rotating the shut-off element. Preferably normals to the outlet openings are orthogonal to a normal to the inlet opening.

According to a further preferred embodiment, the at least one shut-off projection forms an extension of at least a part of the lateral surface of the substantially cylindrical guide body in the direction of the longitudinal axis of the substantially cylindrical guide body of the shut-off element. As a result, the shut-off projection can optimally shut off at least one curved outlet opening.

It is preferred if the shut-off element comprises a groove running in a direction of displacement of the shut-off element and/or the valve housing has a groove running from an outlet opening in the direction of the inlet opening. By this means an excess pressure inside the valve housing can be avoided or reduced.

It is favourable if at least one, preferably at least two, particularly preferably at least three of the outlet openings are arranged perpendicular to the at least one inlet opening. Advantageously the inlet opening is thereby permanently opened wherein outlet openings can preferably be shut off by rotating the shut-off element. Preferably the shut-off projection is formed in such a manner that in one position the inlet opening is completely or at least 50% open and one or more of the outlet openings is open and one or more of the outlet openings is shut off.

For easy manufacture of the valve it is preferable if the valve housing is prism-shaped. Particularly preferably the valve housing is cuboid wherein the base surface is in particular square. Advantageously as a result four outlet openings can be arranged on the valve housing, wherein preferably respectively one outlet opening is arranged on each of the four sides of the lateral surface.

It is further favourable if the at least one inlet opening is arranged on at least one base surface and the one or more outlet openings are arranged on a lateral surface of the prismatic valve housing. Advantageously the one or more outlet openings can be simply shut off as a result.

According to a preferred embodiment, the valve housing has at least two outlet openings and the shut-off projection is suitable for shutting off at least two, preferably precisely two of the outlet openings. As a result, advantageously two outlet openings can be shut off simultaneously with the aid of a shut-off projection. However, the shut-off projection can also be configured for shutting off three, four, five or more outlet openings. For shutting off two adjacent outlet openings in the case of four outlet openings of the valve housing, the shut-off projection preferably forms an L-shaped tongue which forms an imaginary extension of 180° of the lateral surface of the substantially cylindrical guide body. For example, the shut-off projection is for shutting off m adjacent outlet openings of a (preferably prism-shaped) valve housing with n sides and one outlet opening on each side of the casing of the (preferably prism-shaped) valve housing, wherein the shut-off projection covers an angle of m/n*360°.

According to a further preferred embodiment, the valve housing has at least two outlet openings and the shut-off element has two shut-off projections for shutting off at least two, preferably precisely two of the outlet openings. The two shut-off projections are preferably separate from one another. As a result, preferably two outlet openings can be shut off by two shut-off projections, wherein the shut-off projections in the case of a prism-shaped valve housing with rectangular base surface and four outlet openings can be aligned offset by 90° or 180° with respect to one another. However, in the case of a prism-shaped valve housing with rectangular base surface, three shut-off projections can also be provided which, for example, are each offset by 90° with respect to one another and are for shutting off three outlet openings. For easier manufacture it can be advantageous to connect adjacent shut-off projections to one another and thus produce a shut-off projection which for example shuts off 270°. For shutting off two opposite outlet openings in the case of four outlet openings of the valve housing, the shut-off projections preferably each form a tongue which in each case form an imaginary extension of 90° of the lateral surface of the substantially cylindrical guide body. In the case of valve housing having different forms, the outlet openings can be offset with respect to one another by a different angle. For example, in the case of a valve housing which has the shape of a triangular prism and three outlet openings, the outlet openings can be offset with respect to one another by 120°. Valve housings having the form of a hexagonal prism can, for example, have six outlet openings which are offset by 60° with respect to one another. In the case of a prism-shaped valve housing with n sides and respectively one outlet opening on each side of the casing of the prism, the one or more shut-off projections overall cover an angle of m/n*360° in the case of m outlet openings to be shut off simultaneously.

For regulating the temperature of the valve it is favourable if the valve housing has a heating and/or a cooling. Preferably the valve housing has channels for transporting a heating and/or cooling medium.

According to a preferred embodiment, the valve housing has a groove at at least one of the outlet openings. An excess pressure in the valve housing can thereby be avoided since fluid can flow from the inlet opening via the groove to the outlet opening.

According to a further preferred embodiment, the shut-off element has a groove. An excess pressure in the valve housing can also thereby be avoided since fluid can flow from the inlet opening via the groove to the outlet opening.

According to a particularly preferred embodiment, the groove of the valve housing and/or the groove of the shut-off element is a notch wherein the notch in particular has a triangular or parabolic cross-section. The groove of the valve housing and/or the groove of the shut-off element is preferably between 1 mm and 30 mm, particularly preferably between 3 mm and 20 mm long.

It is favourable if the shut-off element of the valve oscillates regularly for flushing a gap in the cavity between the valve housing and the guide body of the shut-off element. As a result, the flushing of the gap can be improved and any cracking of the fluid in the gap can be further reduced. Depending on the preferred type of motion, the shut-off element oscillates in a linear motion in the direction of the longitudinal axis of the cylindrical cavity or in a rotational movement axially to the cylindrical cavity. Particularly preferably the amplitude of the oscillating movement is between 3 mm and 20 mm, preferably between 5 mm and 10 mm, in the case of a linear movement or between ±1° and ±10°, preferably between ±2° and ±5° in the case of a rotating movement.

BRIEF DESCRIPTION OF THE DRAWINGS

The invention is explained further hereinafter with reference to non-restrictive exemplary embodiments shown in the drawings.

FIG. 1a shows schematically a valve according to the invention with a valve housing and a shut-off element in a perspective view;

FIG. 1b shows schematically the valve according to FIG. 1a in a side view;

FIG. 1c shows schematically a vertical section through the valve according to FIG. 1b;

FIG. 1d shows schematically a horizontal section through the valve according to FIG. 1b;

FIGS. 2a and 2b show schematically the valve housing of the valve according to FIG. 1a in a perspective view and a side view respectively;

FIGS. 2c and 2d show schematically a vertical and a horizontal section respectively through the valve housing according to FIG. 2b;

FIGS. 5a-d show schematically the shut-off element of the valve according to FIG. 4a in a perspective view, a front view, a side view and a plan view, respectively;

FIGS. 6*a* and 6*b* show schematically a further valve according to the invention in a perspective view and a side view, respectively;

FIGS. 6*c* and 6*d* show schematically a vertical and a horizontal section respectively through the valve according to FIG. 6*b*;

FIGS. 7*a* and 7*b* show schematically the valve housing of the valve according to FIG. 6*a* in a perspective view and a side view, respectively;

FIGS. 7*c* and 7*d* show schematically a vertical and a horizontal section respectively through the valve housing according to FIG. 7*b*;

FIGS. 8*a* and 8*b* show schematically a valve housing of a further valve according to the invention in a perspective view and a side view, respectively;

FIGS. 8*c* and 8*d* show schematically a vertical and a horizontal section respectively through the valve housing according to FIG. 8*b*;

FIGS. 9*a* and 9*b* show schematically a further valve according to the invention in a perspective view and a side view, respectively;

FIGS. 9*c* and 9*d* show schematically a vertical and a horizontal section respectively through the valve according to FIG. 9*b*;

FIGS. 11*a* and 11*b* show schematically a further valve according to the invention in a perspective view and a side view, respectively;

FIGS. 11*c* and 11*d* show schematically a vertical and a horizontal section respectively through the valve according to FIG. 11*b*;

FIGS. 18*a* and *b* show schematically the shut-off element of the valve according to FIG. 17*a* in a plan view and a perspective view respectively;

FIGS. 19*a* and *b* show schematically the shut-off element of the valve according to the invention in a plan view and a perspective view, respectively.

DETAILED DESCRIPTION

Figure 3A:
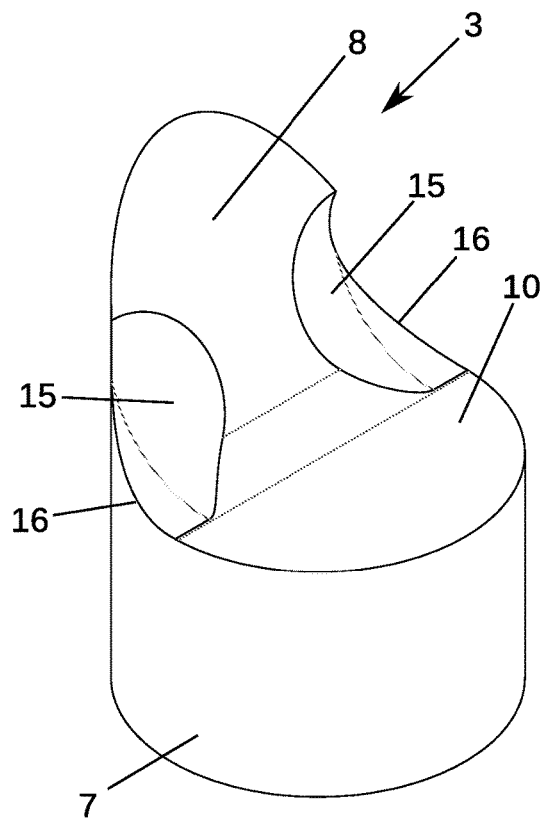
FIGS. 3a-d show schematically the shut-off element of the valve according to FIG. 1a in a perspective view, a front view, a side view and a plan view, respectively.
Figure 3B:
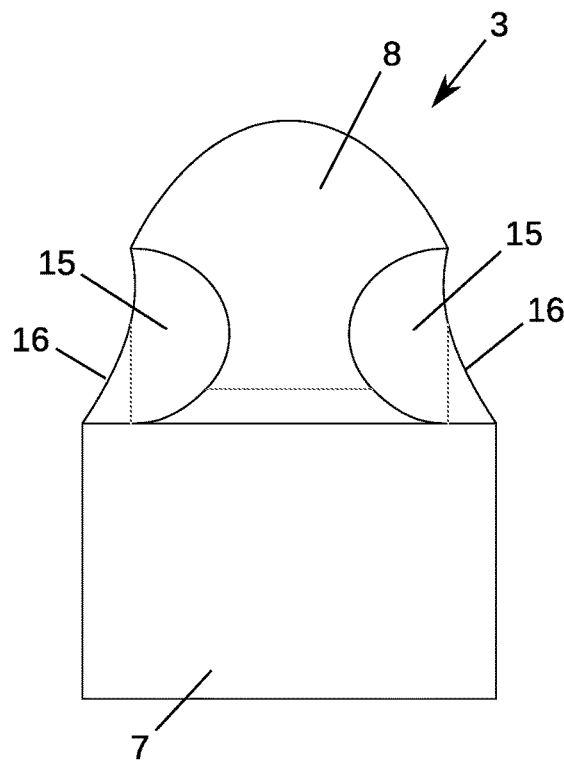
Figure 3C:
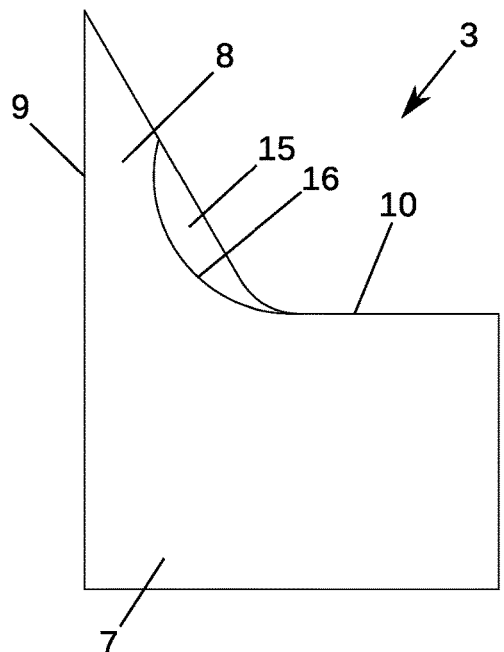
Figure 3D:
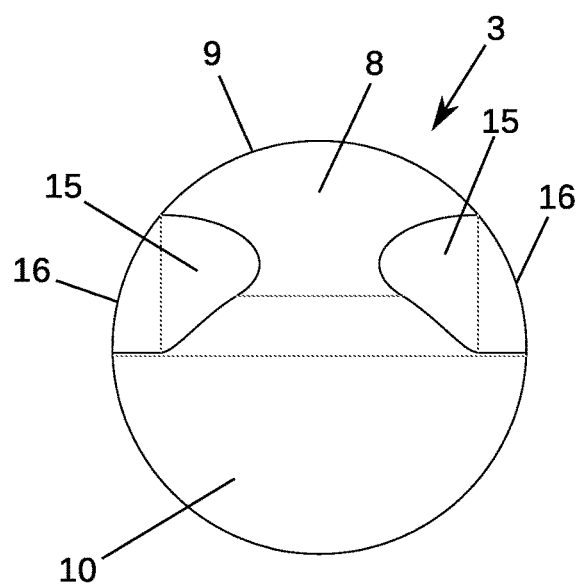

FIGS. 1*a-d* show a valve 1 according to the invention comprising a valve housing 2 and a shut-off element 3, wherein the valve housing 2 has a cavity 4 for receiving the shut-off element 3, an inlet opening 5 for flow of a fluid into the cavity 4 and four outlet openings 6 for flow of the fluid from the cavity 4. The valve housing 2 is prism-shaped, wherein the base surface of the prism is a square. The cavity 4 of the valve housing 2 is a cylindrical bore passing through the valve housing 2, wherein the bore forms a first 12 and a second 13 aperture on two opposite sides of the valve housing 2, which form the square base surface and the square top surface of the prism-shaped valve housing 2. In this case, the first aperture 12 forms the inlet opening 5 of the valve housing 1 so that the inlet opening 5 is congruent with a base surface of the cylindrical cavity 4 and is arranged on the square top surface of the prism-shaped valve housing 2. As a result, the first aperture 12 is arranged on the top surface and the second aperture 13 is arranged on the base surface of the prism-shaped valve housing 2. The diameter of the bore which forms the cavity 4 and is arranged perpendicular to the base and top surface of the prism-shaped valve housing 2 is equal to the diameter of the substantially cylindrical guide body 7 of the shut-off element 3. The inlet opening 5 is arranged on the top surface and the four outlet openings 6 are each accessible via one of the four sides of the lateral surface of the prism-shaped valve housing 2. As a result, the four outlet openings 6 are arranged perpendicular to the inlet opening 5 and in each case offset with respect to one another by 90°. Furthermore the four outlet openings 6 are arranged in a plane perpendicular to the longitudinal axis of the cavity 4.

The guide body 7 is received in the bore in such a manner that the shut-off element 3 partially projects from the second aperture 13. The shut-off element 3 comprises a guide body 7 and a shut-off projection 8 for shutting off respectively one of the outlet openings 6, wherein the shut-off element 3 is arranged movably and partially in the cavity 4 of the valve housing 2. The shut-off projection 8 has a curved abutting surface 9 for abutting against the outlet openings 6 when shutting off the outlet openings 6. The shut-off projection 8 is configured so that it can deflect the medium to be conveyed in the cavity 4 free from dead space. The number and arrangement of the at least one shut-off projection 8 must be matched according to the function jointly with the valve housing 2. As shown in FIG. 1*d*, the guide body 7 of the shut-off element 3 is substantially cylindrical wherein the shut-off projection 8 is arranged on a base surface 10 of the substantially cylindrical guide body 7. In this case, the shut-off projection 8 forms an imaginary extension of a part of the lateral surface of the substantially cylindrical guide body 7 in the direction of the longitudinal axis of the guide body 7 of the shut-off element 3. As a result, the curved abutting surface 9 is the imaginary extension of the part of the lateral surface of the guide body 7. The cavity 4 is cylindrical, wherein the longitudinal axis of the cylindrical housing 4 coincides with the longitudinal axis of the substantially cylindrical guide body 7 of the shut-off element 3.

In the embodiment shown according to FIGS. 1*a-1d*, the valve housing 2 has four further cavities 11 wherein the further cavities 11 are cylindrical and are connected to the cavity 4 via respectively one of the outlet openings 6. As a result, the longitudinal axes of the four cylindrical further cavities 11 are arranged in a plane perpendicular to the longitudinal axis of the cylindrical cavity 4 and form four bores which are each arranged on one of the four sides of the lateral surface of the prism-shaped valve housing 2.

The valve 1 has a drive not shown in FIGS. 1*a-d* for rotating the shut-off element 3 about the longitudinal axis of the substantially cylindrical guide body 7 wherein the drive engages at the end of the shut-off element 3 projecting from the second aperture 13.

As shown in FIG. 1*d*, the shut-off projection 8 is for shutting off one of the four outlet openings 6. To this end, the curved abutting surface 9 of the shut-off projection 8 is configured in such a manner that by rotation of the shut-off element 3, it can cover respectively one outlet openings 6 so that no fluid can flow through the covered outlet opening 6. When the shut-off element 3 rotates further by 90°, the shut-off outlet opening 6 is opened again and the adjacent outlet opening 6 arranged offset by 90° is shut off by the shut-off projection 8. As a result, depending on the position of the shut-off projection 8, respectively one of the four outlet openings 6 can be shut off and the other three outlet openings 6 can be open. Thus, the fluid flowing in via the inlet opening 5 can flow out from the valve 1 via the three open outlet openings 6. Since the outlet openings 6 are each arranged offset by 90° with respect to one another, the shut-off projection 8 covers 90°, as shown in FIG. 1*d*. By rotating the shut-off element between 0° and 90°, a shut-off outlet opening 6 can be gradually partially opened. In this case at the same time an adjacent outlet opening 6 is continuously gradually closed. Furthermore by means of a linear movement of the shut-off element 3 in the direction of the longitudinal axis of the cylindrical cavity 4 from the second aperture 13, all the outlet openings 6 can be opened. In the event of a linear movement of the shut-off element 3 in the opposite direction, namely in the direction of the inlet opening 5, all the outlet openings 6 can be shut off whereby the guide body 7 covers and thus shuts off the four outlet openings 6.

As shown in FIGS. 1*a-d*, the valve housing 2 has heating and/or cooling channels 14 for conducting heating and/or cooling medium. With the aid of the heating and/or cooling medium, the valve 1 and consequently the fluid flowing through the valve 1 can be heated or cooled. The following fluids can be used as heating and/or cooling medium:

aqueous heating or cooling media, for example, water or water-alcohol mixtures such as, for example, glycols
    thermal oils such as, for example, mineral oils such as, for example, diesel oils
    air as cooling medium
    water vapour as heating medium
    all other liquids or gases which are suitable for the application and process conditions.

Furthermore, a heating can also be electrical, for example with a heating bowl or heating belt.

Depending on the application, temperature control can take place in the range between 0 and 350° C., preferably between 60 and 170° C., particularly preferably between 80 and 120° C. In order to avoid sealing dead spaces, the substantially cylindrical shut-off element 3 is implemented with a defined tolerance appropriate to the cylindrical cavity 4. Optimized to the conveying medium and the operating state of the valve 1 (fluid pressure, temperature), a defined gap can be produced between the shut-off element 3 and the valve housing 2 which results in a defined flow along the shut-off element 3. The gap is regularly flushed by this flow and a permanent deposition of material in the valve housing 2 is prevented and therefore a freedom from dead space is ensured. The fluid flow can be regulated by a press seal externally on the base surface of the valve housing 2. As a result of a regularly recurring, oscillating linear movement of the shut-off element 3 in the direction of the longitudinal axis of the cylindrical cavity 4 in the direction of the inlet opening 5, a flushing of the gap in the cavity 4 between the valve housing 2 and the guide body 7 of the shut-off element can be improved and any cracking of the fluid in the gap can be further reduced.

The valve 1 according to the invention can be used, for example, in the manufacturing process of a cellulose/aminoxide solution. As a result of the configuration of the shut-off element 3, spinning mass is prevented from accumulating and decomposing in dead spaces of the system. Even in cases of fairly long storage of spinning mass in the valve 1, the shut-off element 3 does not seize up in the valve housing 2 since the shut-off element 3 can be periodically set in motion and flushed. Thus, the present invention also provides a method for transporting a solution of cellulose in an aqueous tertiary aminoxide through a valve 1 in which the flow rate of the cellulose solution in the valve housing 2 can be periodically adjusted and varied in order to ensure that a safe discharge, distribution and safe transport of the cellulose/aminoxide solution is possible.

The following materials can be used inter alia for the manufacture of the shut-off element 3 and the valve housing 2, wherein the shut-off element 3 and the valve housing 2 can comprise different materials:

steels, tool steel, unalloyed steels, chromium nickel steels such as stainless steels according to DIN EN 10088-3, for example X5CrNi18-10 (1.4301) or
    aluminium, for example, hardenable aluminium magnesium silicon alloys, for example EN AW-6060 or
    plastics, for example, thermoplastics, for example PTFE or
    all other dimensionally stable materials which withstand the required process conditions.

FIGS. 2*a-d* show the valve housing 2 according to the embodiment according to FIGS. 1*a-d* without the heating and/or cooling channels 14. The four outlet openings 6 and four cylindrical further cavities 11 can be produced by two bores guided perpendicularly to one another, whereby the valve housing 2 is drilled through on two mutually perpendicular sides of the casing of the prism-shaped valve housing 2. A cross-shaped cavity is therefore formed. Perpendicular to this cross, the cavity 4 and the inlet opening 5 as well as the first aperture 12 and second aperture 13 can be produced by a further bore.

FIGS. 3*a*-3*d* show the shut-off element 3 according to the embodiment of the valve 1 according to the invention shown in FIGS. 1*a-d*. This shut-off element 3 can also be used in combination with embodiments of the valve 1 other than that shown in FIGS. 1*a-d*. The guide body 7 of the shut-off element 3 is substantially cylindrical, wherein the shut-off projection 8 is arranged on the substantially circular base surface 10 of the substantially cylindrical guide body 7 of the shut-off projection 8. The shut-off projection 8 forms an imaginary extension of a part of the lateral surface of the substantially cylindrical guide body 7 in the direction of the longitudinal axis of the guide body 7 perpendicular to the substantially circular base surface 10. As shown in FIGS. 3*a-d*, the shut-off projection 8 is substantially delimited by the extension of the lateral surface of the cylindrical guide body 7 and a limiting plane which runs through the central point of the substantially circular base surface 10 and divides, e.g. halves this base surface 10 and encloses with the cylindrical guide body 7 an angle α which is proportional to the ratio of the base area 7 (D1) and the opening 11 (D2): α f(D2/D1). Furthermore, the shut-off projection 8 has two recesses 15 which are arranged on two opposite sides of the shut-off projection 8 and are delimited by the limiting plane, the base surface 10 and the extension of the lateral surface of the substantially cylindrical guide body 7. Furthermore the recesses 15 have a circular segment-shaped limiting line 16 which, when shutting off an outlet opening 6, abut against the contour of the two outlet openings 6 adjacent to the shut-off outlet opening 6. The recesses 15 are used for an optimal flow of the fluid flowing from the inlet opening 5 to the outlet openings 6.

Figure 4A:
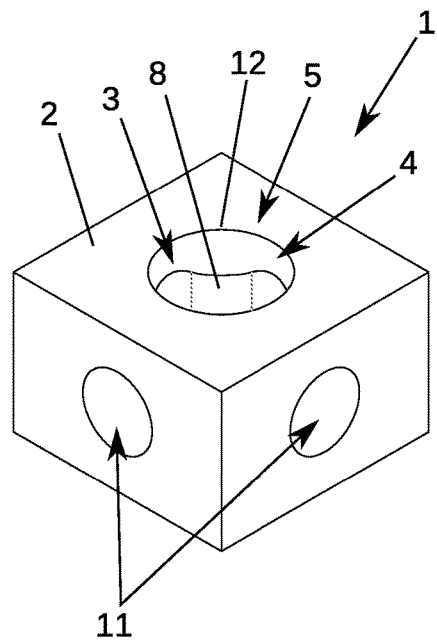
FIGS. 4a and 4b show schematically a further valve according to the invention in a perspective view or a side view, respectively.
Figure 4B:
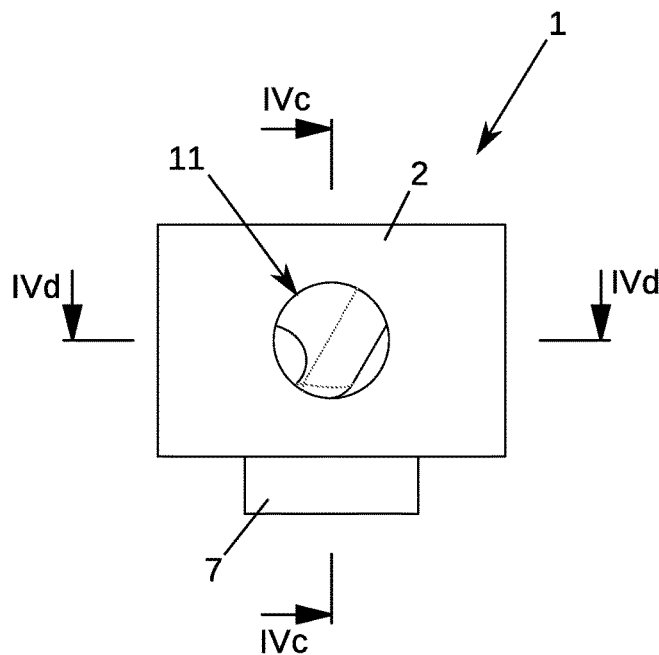
Figure 4C:
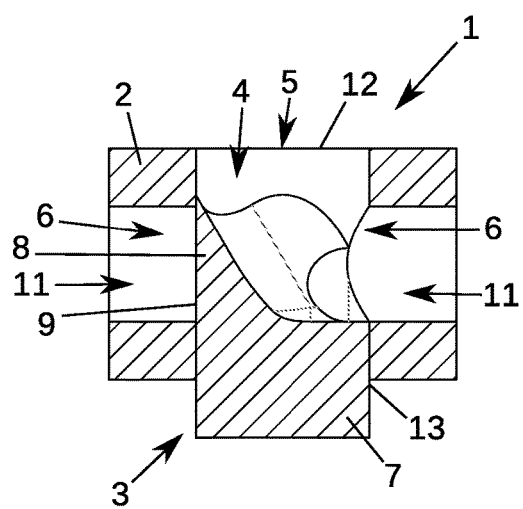
FIGS. 4c and 4d show schematically a vertical and a horizontal section respectively through the valve according to FIG. 4b.
Figure 4D:
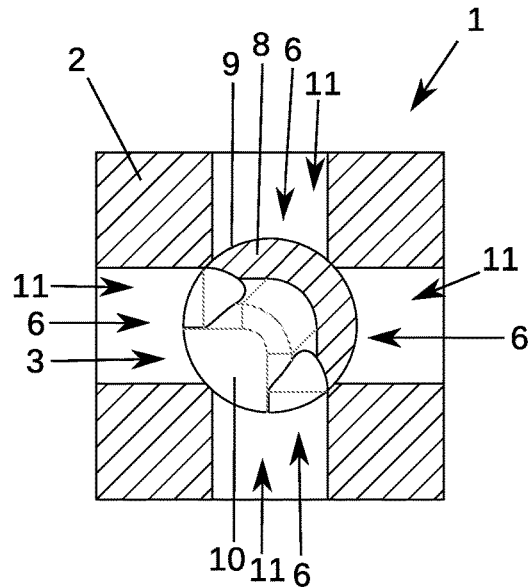
Figure 10A:
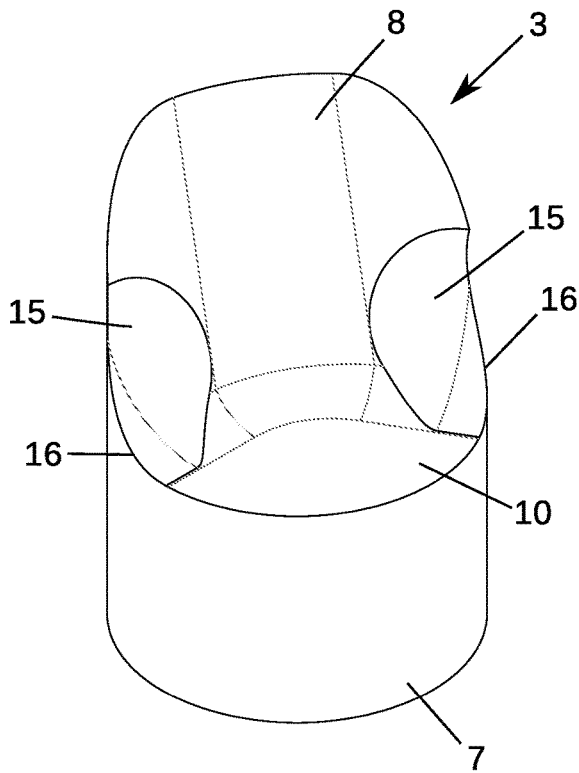
FIGS. 10*a-d* show schematically the shut-off element of the valve according to FIG. 9*a* in a perspective view, a front view, a side view and a plan view, respectively.
Figure 10B:
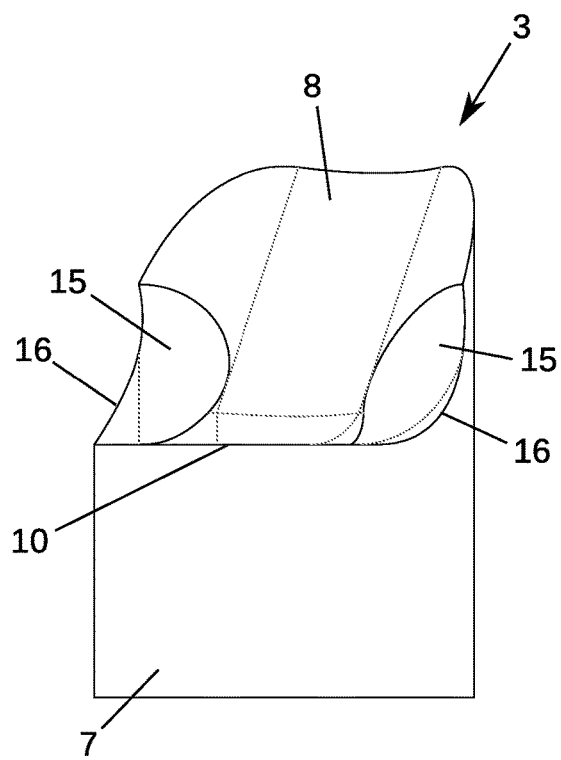
Figure 10C:
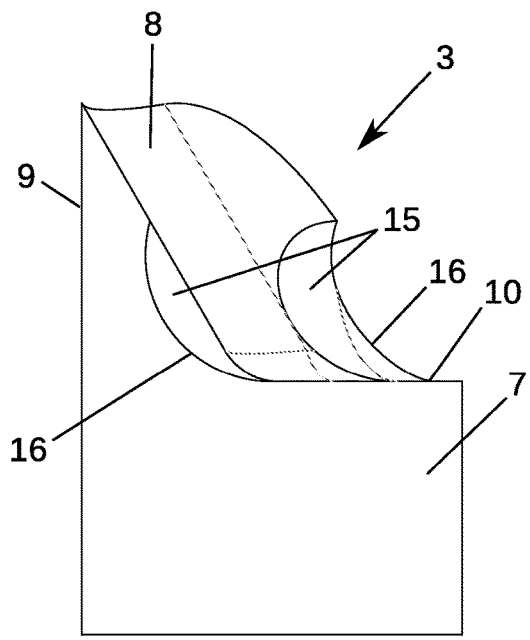
Figure 10D:
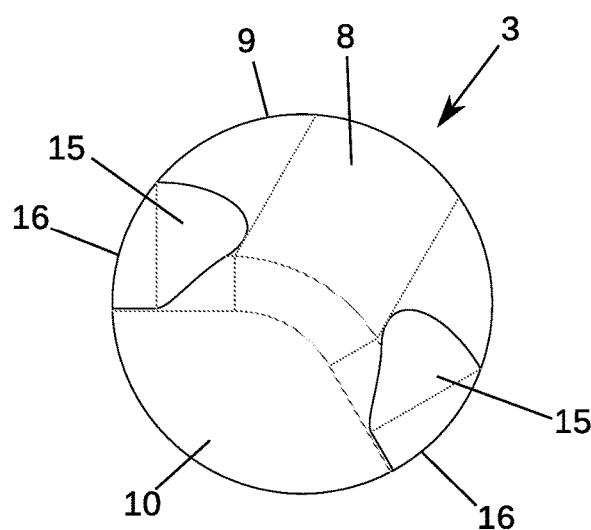
Figure 12A:
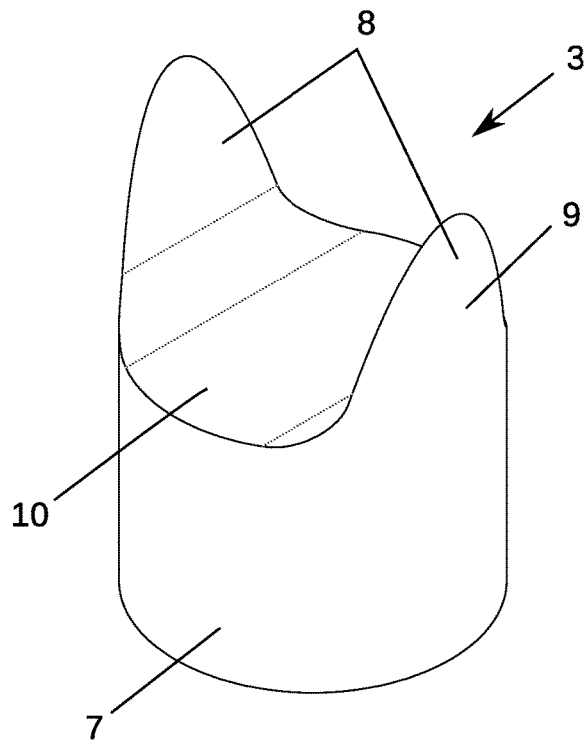
FIGS. 12*a-d* show schematically the shut-off element of the valve according to FIG. 11*a* in a perspective view, a front view, a side view and a plan view, respectively.
Figure 12B:
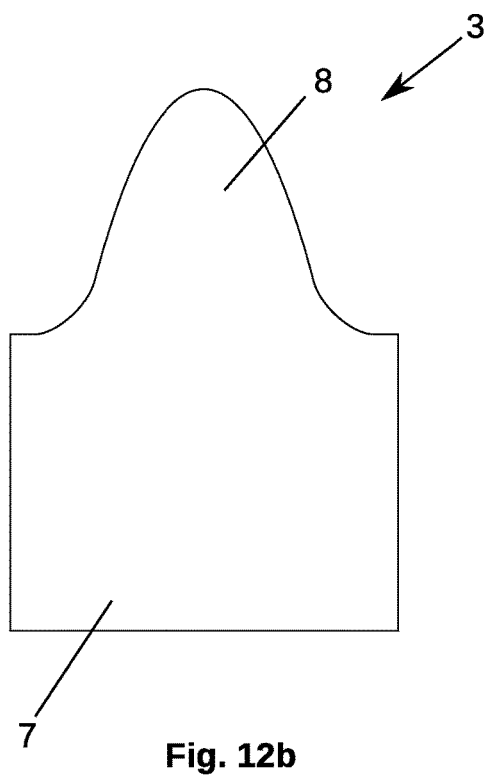
Figure 12C:
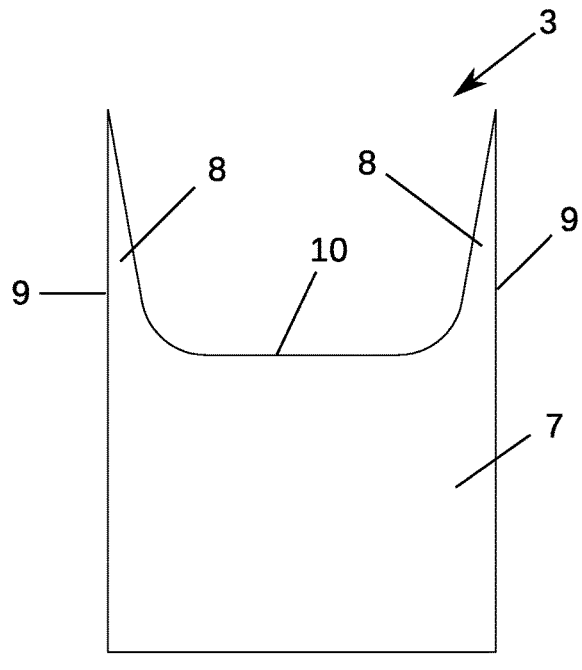
Figure 12D:
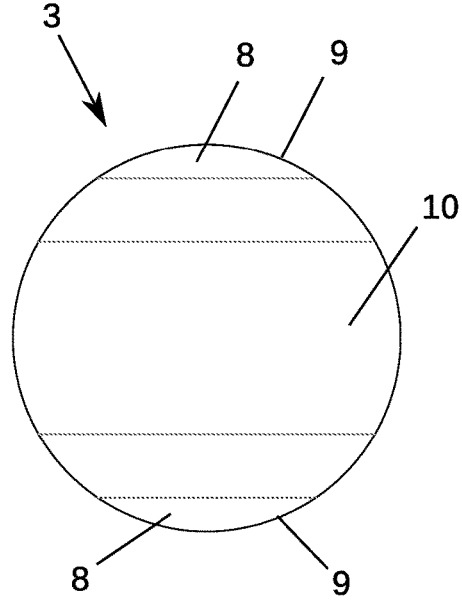
Figure 13A:
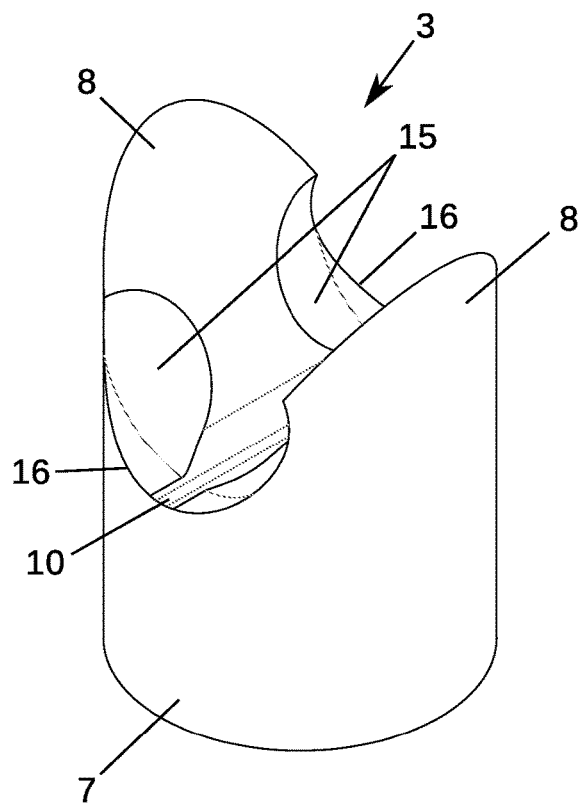
FIGS. 13*a-d* show schematically the shut-off element of a further valve according to the invention in a perspective view, a front view, a side view and a plan view, respectively.
Figure 13B:
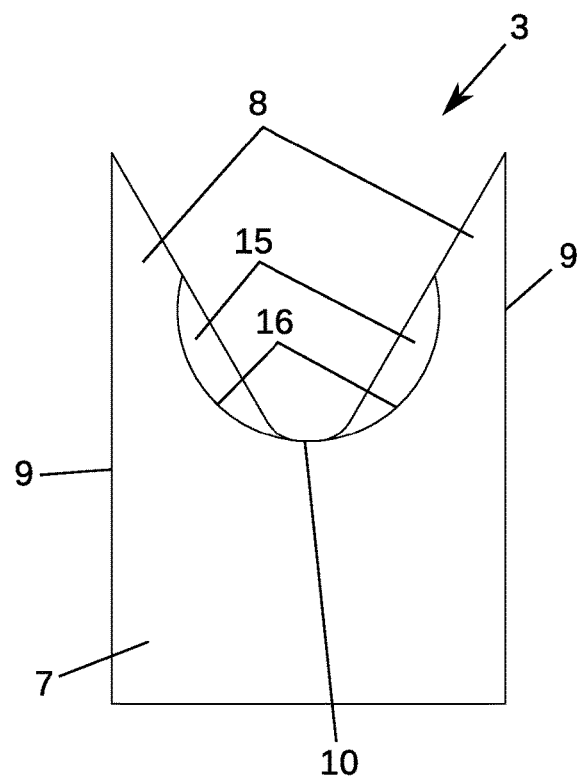
Figure 13C:
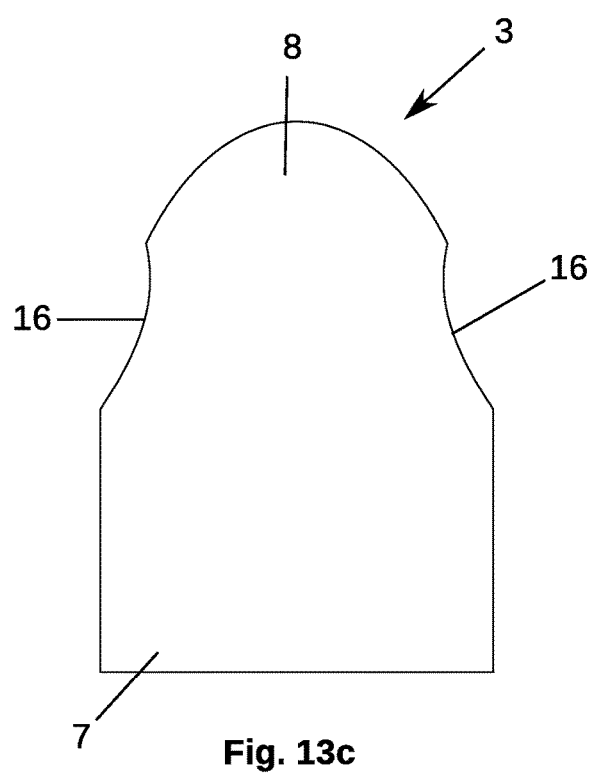
Figure 13D:
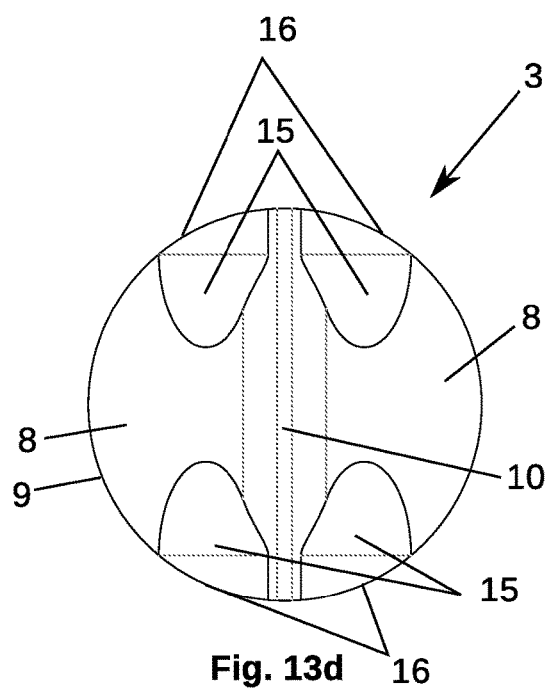
Figure 14A:
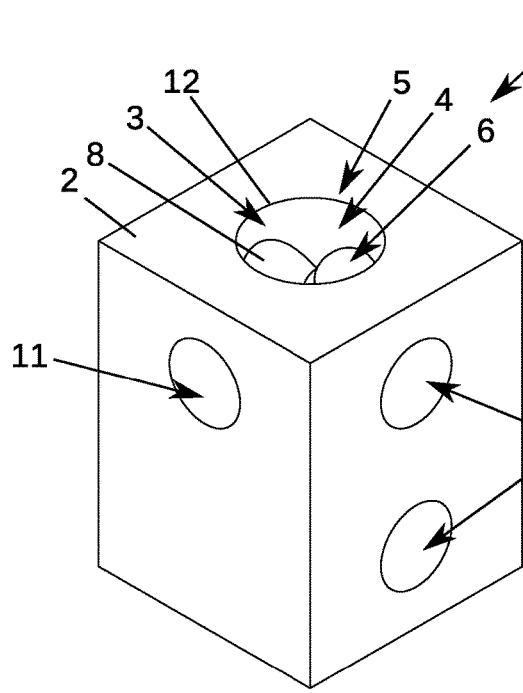
FIGS. 14*a* and 14*b* show schematically a further valve according to the invention in a perspective view and a side view, respectively.
Figure 14B:
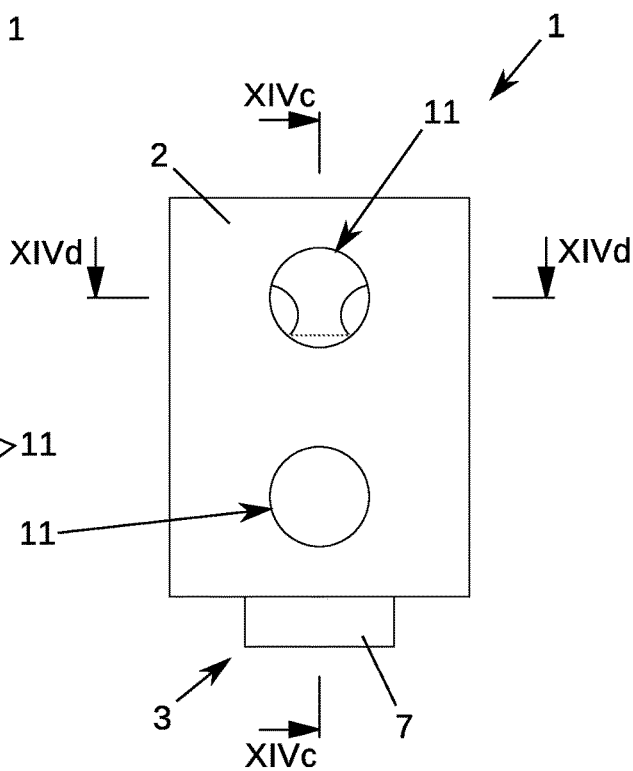
Figure 14C:
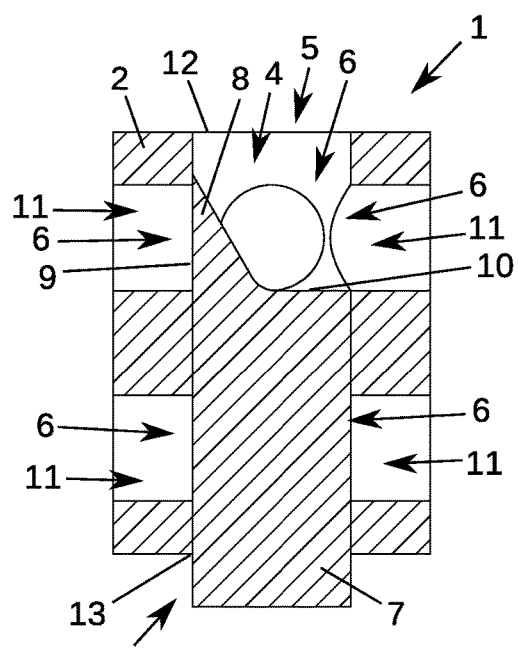
FIGS. 14*c* and 14*d* show schematically a vertical and a horizontal section respectively through the valve according to FIG. 14*b*.
Figure 14D:
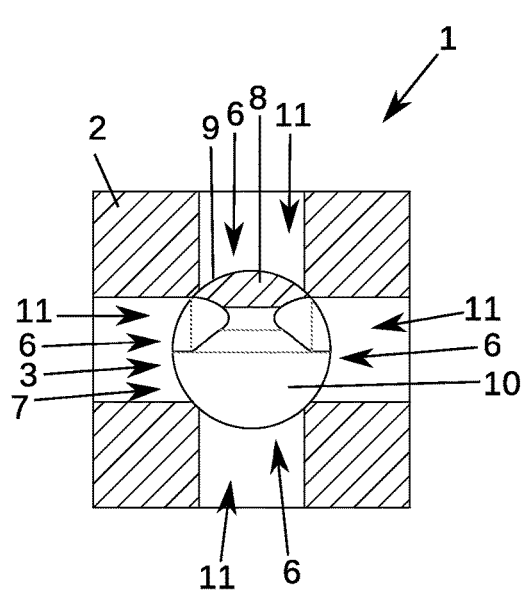

FIGS. 4*a-d* show a further valve 1 according to the invention with a valve housing 2 according to FIGS. 2*a-d* and a shut-off element 3 for shutting off two outlet openings 6. The shut-off projection 8 in this case covers and angle of 180° so that, as shown in FIG. 4*d*, two adjacent outlet openings 6 arranged at 90° with respect to one another can be shut off simultaneously with the aid of the shut-off element 3. As a result, the two further outlet openings 6 of the total of four outlet openings, which are also adjacent and arranged at 90° with respect to one another are open so that fluid can flow through these two outlet openings 6 from the valve 1.

FIGS. 5*a-d* show the shut-off element 3 of the valve 1 according to FIGS. 4*a-d*. The shut-off projection 8 covers three quarters of the substantially circular base surface 10 of the substantially cylindrical guide body 7. The substantially circular base surface 10 is adjoined by the two recesses 15 of the shut-off projection 8 so that the recesses 15 are offset by 90° with respect to one another. The recesses 15 are used for an improved fluid flow from the cavity 4 to the outlet openings 6 which are not shut off by the shut-off projection 8 and are therefore open. With the aid of the shut-off projection 8, in this case in the valve housing 2 shown in FIGS. 4*a-d*, two adjacent outlet openings 6 which are offset with respect to one another by 90° of the total of four outlet openings can be shut off.

FIGS. 6*a-d* show a further valve 1 according to the invention with the shut-off element 3 according to FIGS. 3*a-d*. The valve housing 2 is prism-shaped with a square base and top surface, wherein the inlet opening 5 is arranged on the top surface of the prism-shaped valve housing 2. In the embodiment shown according to FIGS. 6*a-d*, the valve housing 2 has a further cavity 11 wherein the further cavity 11 has the form of a skew cylinder and is arranged on one side of the casing of the prism-shaped valve housing 2. The further cavity 11 is connected via an outlet opening 6 to the cavity 4 of the valve housing 2, wherein the outlet opening 6 is arranged perpendicular to the inlet opening 5. The further cavity 11 can be produced by a bore whereby the valve housing 2 is drilled through on one side of the casing of the prism-shaped valve housing 2. By rotating the shut-off element 3 in the valve housing 2, the one outlet opening 6 can be completely or partially continuously shut off. Starting from an open outlet opening 6 in which the shut-off projection 8 is arranged on a side of the cavity 4 opposite the outlet opening 6, wherein the outlet opening 6 and the shut-off projection 8 are arranged in the axial direction of the cylindrical cavity 4 at the same height, the shut-off element 3 is rotated in such a manner that the shut-off projection 8 is moved in the direction of the outlet opening 6. As soon as the shut-off projection 8 partially covers the outlet opening 6 due to the rotation of the shut-off projection 8, the cross-section of the outlet opening 6 which is not covered by the shut-off projection 8 and therefore open becomes smaller so that the fluid flow through the outlet opening 6 is reduced. During further rotation of the shut-off element 3 the free cross-section of the outlet opening 6 is further reduced so that the fluid flow through the outlet opening 6 is further reduced. As a result, a continuous flow regulation of the fluid flow through the outlet opening 6 from the valve 1 is possible. Since the fluid flows via the inlet opening 5 into the cavity 4 and is conveyed further with the aid of the shut-off element 3 to the outlet opening 6, no dead space exists in the valve housing 2. Since the guide body 7 is flushed with fluid that flows in the gap in the cavity 4 between the valve housing 2 and the guide body 7, no dead space exists between the movable shut-off element 3 and the static valve housing 2.

FIGS. 7*a-d* show the valve housing 2 of the exemplary embodiment of the valve 1 according to the invention shown in FIGS. 6*a-d*. The longitudinal axis of the cylindrical cavity 4 and the skew cylindrical further cavity 11 enclose an angle of approximately 75°.

FIGS. 8*a-d* show the valve housing 2 of a further valve according to the invention. In contrast to the valve housing 2 according to the embodiment shown in FIGS. 1*a-d*, the valve housing 2 has two further cavities 11 arranged one above the other on one side of the casing so that the valve housing 2 has a total of five further cavities 11 which are connected via five outlet openings 6 to the cavity 4 of the valve housing 2. By rotating the shut-off element 3, the two outlet openings 6 arranged one above the other can be shut off or opened jointly. As a result of a linear movement of the shut-off element 3 in the cavity 4, the one of the two outlet openings 6 arranged one above the other, which is arranged closer to the inlet opening 5, can remain open whereas the other can be shut off.

FIGS. 9*a-d* show a further valve 1 according to the invention, wherein the valve housing 2 is prism-shaped. The base and the top surface of the prism have the form of an equilateral triangle. Similarly to the valve housing 2 according to the embodiment shown in FIGS. 1*a-d*, the valve 1 has three outlet openings 6 and three further cavities 11 wherein the further cavities 11 are cylindrical and connected via respectively one of the outlet openings 6 to the cavity 4. As a result, the longitudinal axes of the three cylindrical further cavities 11 are arranged in a plane perpendicular to the longitudinal axis of the cylindrical cavity 4 and form three bores which are each arranged on one of the three sides of the lateral surface of the prism-shaped valve housing 2. Thus, the three bores each enclose an angle of 120°.

FIGS. 10*a-d* show the shut-off element 3 of the valve 1 according to FIGS. 9*a-d*. The shut-off projection 8 covers two thirds of the substantially circular base surface 10 of the substantially cylindrical guide body 7. The two recesses 15 of the shut-off projection 8 adjoin the substantially circular base surface 10 so that the recesses 15 are offset with respect to one another by 120°. As a result, one of the three outlet openings 6 of the valve housing 2 according to the embodiment shown in FIGS. 9*a-d* can be shut off.

FIGS. 11*a-d* show another valve 1 according to the invention, wherein the valve housing 2 is prism-shaped. The base and the top surface of the prism have the form of a hexagon. Similarly to the valve housing 2 according to the embodiment shown in FIGS. 1*a-d*, the valve 1 has six outlet openings 6 and six further cavities 11, wherein the further cavities 11 are cylindrical and connected to the cavity 4 via respectively one of the outlet openings 6. As a result, the longitudinal axes of the six cylindrical further cavities 11 are arranged in a plane perpendicular to the longitudinal axis of the cylindrical cavity 4 and form six bores which are each arranged on one of the six sides of the lateral surface of the prism-shaped valve housing 2. Thus, the six bores each enclose an angle of 60°. The shut-off element 3 according to the embodiment shown in FIGS. 11*a-d* has two shut-off projections 8 and is used to shut off two opposite outlet openings 6.

FIGS. 12a-d show the shut-off element 3 of the valve 1 according to FIGS. 11a-d. The two shut-off projections 8 are arranged on two opposite sides of the substantially circular base surface 10 of the substantially cylindrical guide body 7 and each have the form of a tongue. In this case, the shut-off projections 8 each cover 60° of the extended lateral surface of the guide body 7 so that in the case of the prism-shaped valve body 2 with a hexagonal base surface according to the embodiment shown in FIGS. 11a-d, two opposite outlet openings 6 can be shut off.

FIGS. 13a-d show a further embodiment of the shut-off element 3 according to the invention which, in contrast to the embodiment of the shut-off element 3 shown in FIGS. 3a-d, has two shut-off projections 8 of the same type. In this case, in addition to the shut-off projection 8 of the shut-off element 3 according to FIGS. 3a-d, a further shut-off projection 8 is provided on the opposite side of the substantially circular base surface 10 so that the one shut-off projection 8 is a mirror image of the other shut-off projection 8 mirrored about the longitudinal axis of the cylindrical guide body 7.

FIGS. 14a-d show a further embodiment of the valve 1 according to the invention. The valve housing 2 corresponds to two valve housings 2 arranged one above the other according to the embodiment of the valve housing 2 shown in FIGS. 2a-d, wherein the lower of the two valve housings 2 arranged one above the other according to FIGS. 2a-d, that is further away from the inlet opening 5, has three instead of four outlet openings 6. Thus, on three sides of the casing of the prism-shaped valve housing 2 according to FIGS. 14a-d, two further cavities 11 offset in the direction of the longitudinal axis of the cylindrical cavity 4 are provided and a further cavity 11 is provided on one side of the casing. As a result, the valve housing has four upper and three lower outlet openings 6 wherein the upper outlet openings 5 are closer to the inlet opening 6 than the lower outlet openings 5. If the shut-off element 3 is positioned in the cavity 4 in such a manner that the shut-off projection 8 is arranged at the same height as the four upper outlet openings 6, the three lower outlet openings 6 are shut off. In addition, one of the four upper outlet openings 6 can be at least partially shut off. If the shut-off element 3 is moved linearly in the direction of the second aperture 13 so that the shut-off projection 8 is arranged at the same height as the three lower outlet openings 6, the four upper outlet openings 6 are opened. In addition, one of the three lower outlet openings 6 can be shut off at least partially with the aid of the shut-off projection 8 wherein the other two lower outlet openings are opened.

Figure 15A:
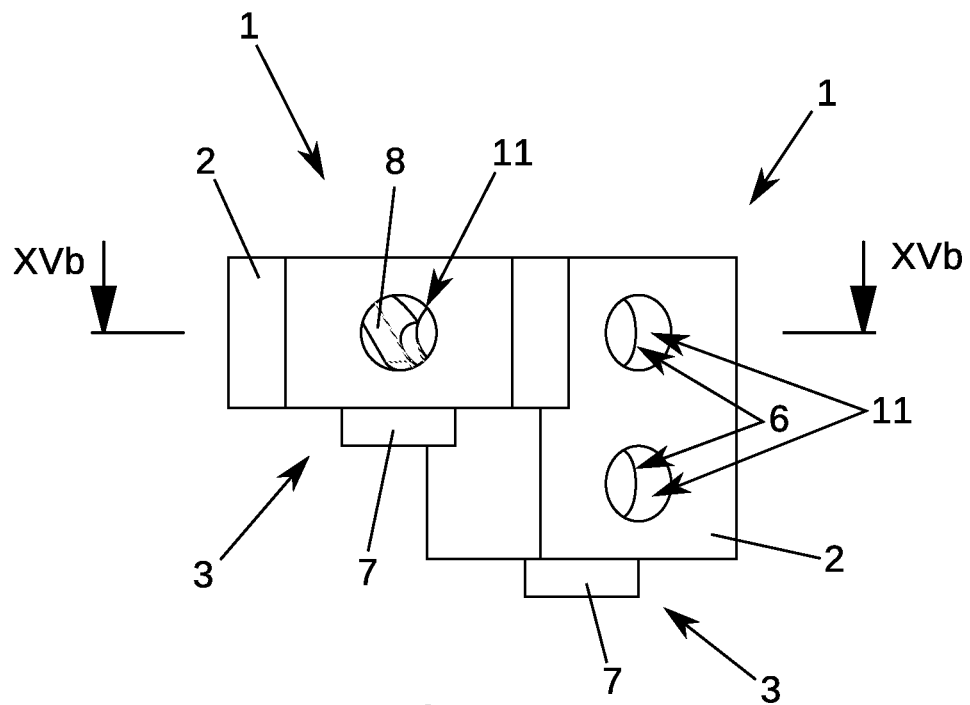
FIGS. 15*a* and 15*b* show schematically a valve arrangement with a valve according to FIG. 9 and two valves according to FIG. 14*a*.
Figure 15B:
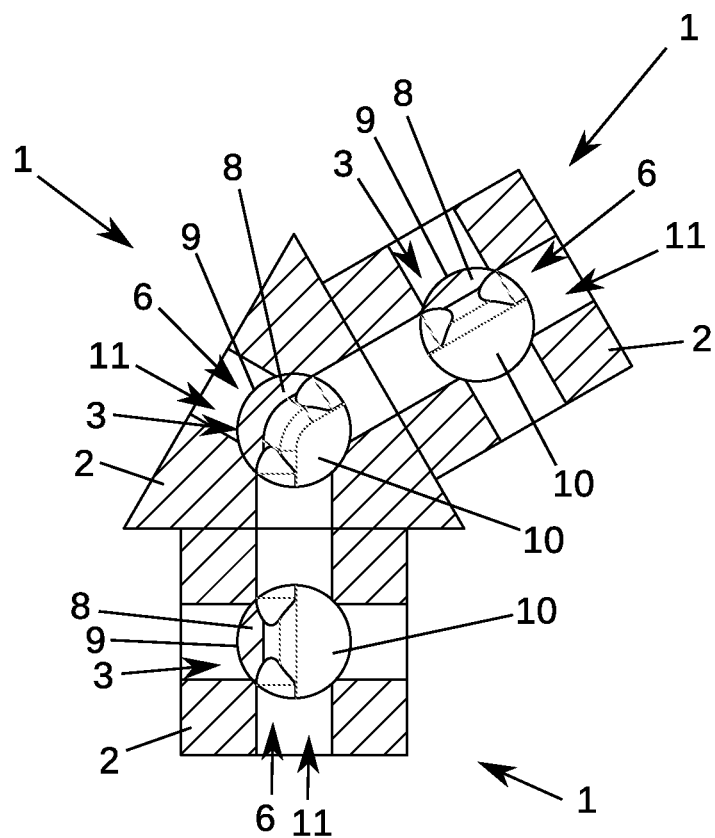

FIGS. 15a and 15b show a valve 1 according to the invention according to the embodiment shown in FIGS. 9a-d, on which respectively one valve 1 according to the embodiment shown in FIGS. 14a-d is arranged on two sides of the casing of the prism-shaped valve housing 2.

Figure 16A:
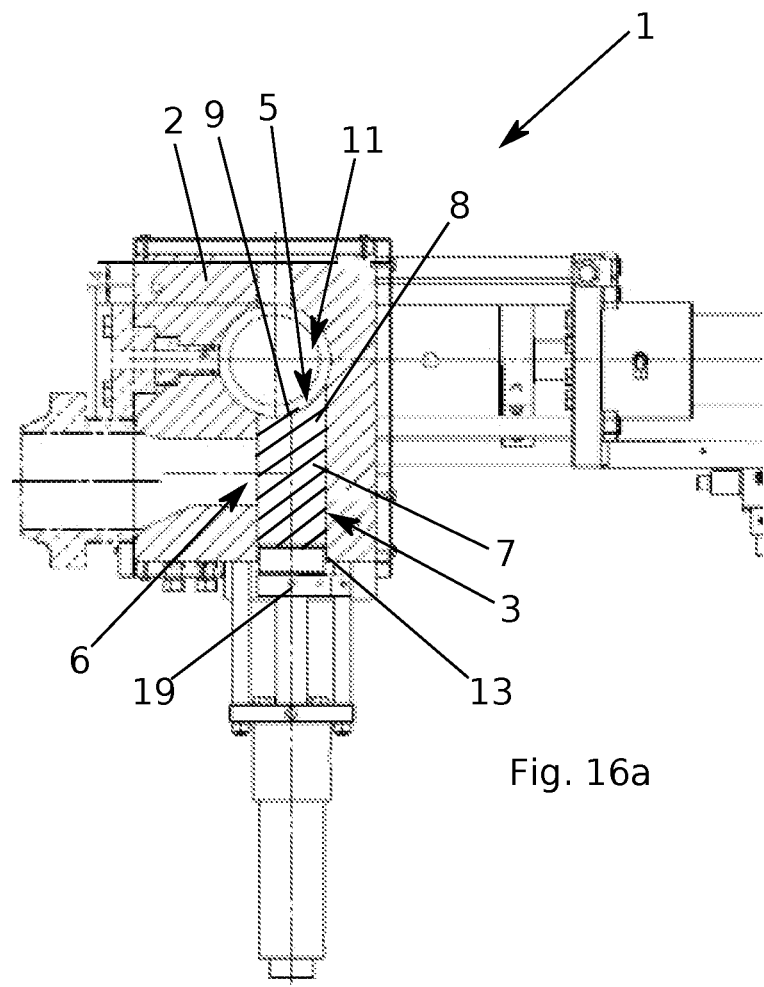
FIG. 16*a* shows schematically a further valve according to the invention with a valve housing and a shut-off element in a shut-off state.
Figure 16B:
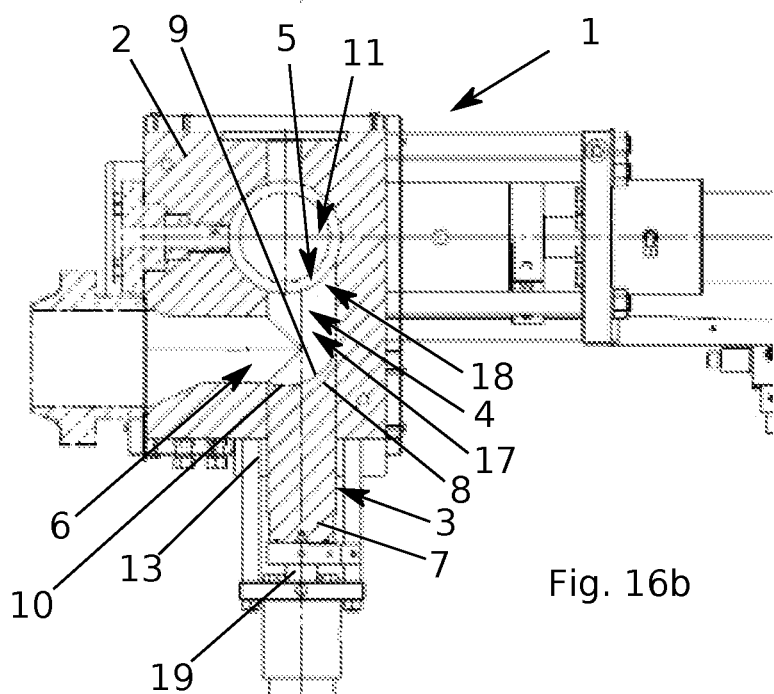
FIG. 16*b* shows schematically the valve according to FIG. 16*a* in an open state.

FIGS. 16a and 16b show a further a valve 1 according to the invention comprising a valve housing 2 and a shut-off element 3, wherein the valve housing 2 has a cavity 4 for receiving the shut-off element 3, an inlet opening 5 for flow of a fluid into the cavity 4 and an outlet opening 6 for flow of the fluid from the cavity 4. The shut-off element 3 comprises a guide body 7 and a shut-off projection 8 for shutting off the outlet opening 6 and is arranged movably in the cavity 4 of the valve housing 2. The shut-off projection 8 has a curved abutting surface 9 for abutting against the outlet opening 6. In the embodiment shown according to FIGS. 16a and 16b, the curved abutting surface 9 is circular-arc-shaped in order to be able to abut against the outlet opening 6. The inlet opening 5 is arranged on a lateral surface of a cylindrical further cavity 11. The inlet opening 5 connects the cavity 4 and the further cavity 11 perpendicular to the cavity 4. The guide body 7 of the shut-off element 3 is substantially cylindrical, wherein the shut-off projection 8 is arranged on a base surface 10 of the substantially cylindrical guide body 7. The cavity 4 has a cylindrical first section 17 and a second section 18 which is arranged between the first section 17 and the further cavity 11. In this case, the cylindrical further cavity 11 is arranged in the longitudinal direction of the cylindrical first section 17 of the cavity 4, wherein the longitudinal axis of the cylindrical further cavity 11 is perpendicular to the longitudinal axis of the cylindrical first section 17. The shut-off projection 8 has the same shape as the second section 18 of the cavity 4. The shut-off element 3 is arranged in such a manner in the cavity 4 that the longitudinal axis of the cylindrical first section 17 of the cavity 4 coincides with the longitudinal axis of the substantially cylindrical guide body 7 of the shut-off element 3.

In the embodiment shown according to FIGS. 16a and 16b the inlet opening 5 is arranged on the lateral surface of the cylindrical first section 17 of the cavity 4. The first section 17 of the cavity 4 is a cylindrical bore passing through the valve housing 2 which forms a second aperture 13 on the side opposite the second section 18 of the cavity 4. The guide body 7 is received in the bore in such a manner that the shut-off element 3 partially projects from the second aperture 13. The valve 1 has a drive 19 for linear movement of the shut-off element 3 in the direction of the longitudinal axis of the substantially cylindrical guide body 7, wherein the drive 19 engages at the end of the shut-off element 3 projecting from the second aperture 13.

In FIG. 16a the valve 1 is in the closed state wherein the curved abutting surface 9 of the shut-off projection 8 abuts against the inlet opening 5. In addition, the guide body 7 of the shut-off element 3 abuts against the outlet opening 5 and shuts this off so that no fluid can flow from the inlet opening 5 into the cavity 4 of the valve 1 and further to the outlet opening 6. In this position, the shut-off projection 8 is arranged in the second section 18 of the cavity 4 and the guide body 7 is arranged in the first section 17 of the cavity 4. In order to avoid a dead space of the fluid in the valve 1, a gap can be formed in the cavity 4 between the valve housing 2 and the guide body 7 so that fluid can flow through the inlet opening 5 via the gap into the cavity 4 and further to the outlet opening 6 and the further cavity 11. As a result, a long dwell time of the fluid in the valve 1 can be avoided. During linear movement of the shut-off element 3 in the longitudinal direction of the cylindrical first section 17 of the cavity 4 in the direction of the second aperture 13, the guide body 7 of the shut-off element 3 moves past the inlet opening 5. During this passage of the guide body 7, the inlet opening 5 is continuously opened so that a fluid can flow through the partially open inlet opening 5 into the cavity 4 and further to the outlet opening 6 and the further cavity 11. In this case, the fluid in the cavity 4 is guided by the base surface 10 of the substantially cylindrical guide body 7 and the curved abutting surface 9 of the shut-off projection 8 in such a manner so that the flow of fluid in the cavity 4 is improved. During further linear movement of the shut-off element 3 in the direction of the second aperture 13, the inlet opening 5 is further opened until the guide body 7 no longer covers the inlet opening 5 and, as shown in FIG. 16b, the inlet opening 5 is completely opened. In this case, the base surface 10 of the substantially cylindrical guide body 7 contacts the inlet opening 5 on the side facing away from the outlet opening 6. With the aid of the base surface 10 and the curved abutting surface 9 of the shut-off projection 8, the fluid is guided in the cavity 4 in the direction of the outlet opening 6, wherein the flow of the fluid is improved compared to a shut-off element without shut-off projection 8.

Figure 17A:
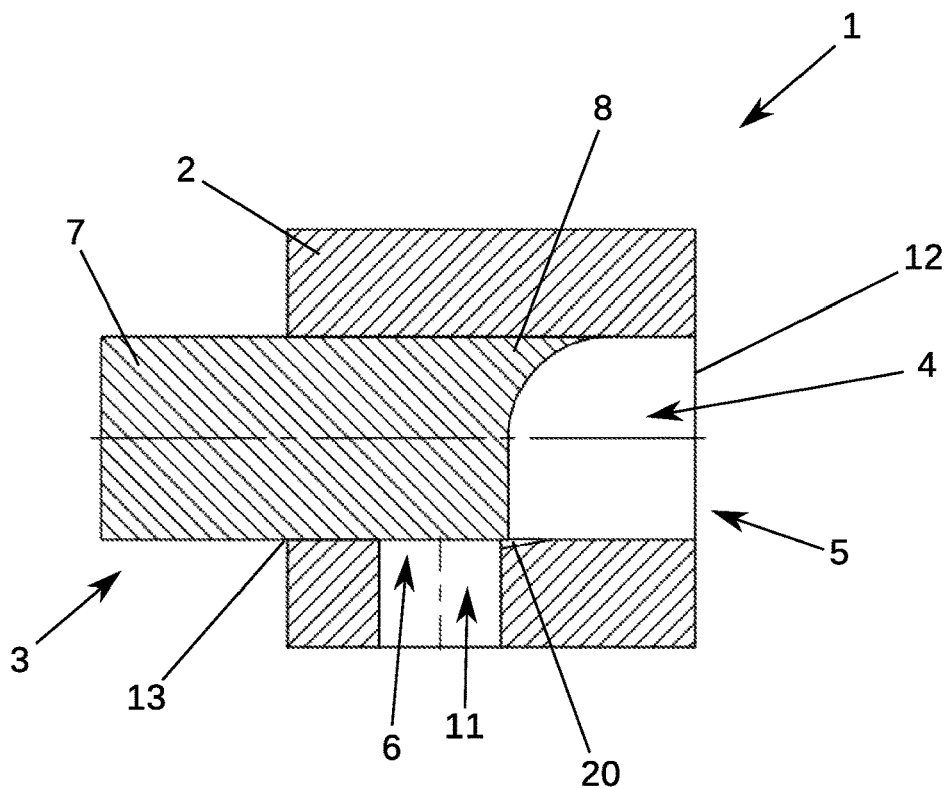
FIG. 17*a* shows schematically a section of a further valve according to the invention.

In order to avoid an excess pressure inside the valve housing 2, as shown in FIG. 17*a*, the valve housing 2 can have a groove 20 at at least one of the outlet openings 6. Preferably the groove 20 is arranged on the side of an outlet opening 6 facing the inlet opening 5.

Figure 17B:
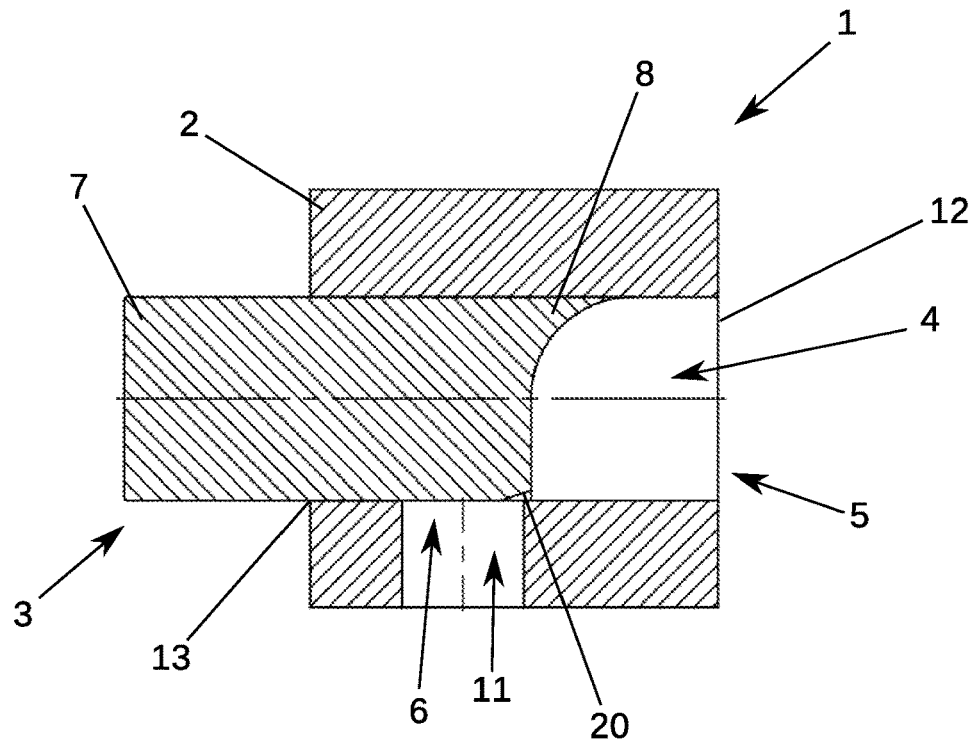
FIG. 17*b* shows schematically a section of a further valve according to the invention.

Alternatively, as shown in FIG. 17*b*, in order to avoid an excess pressure inside the valve housing 2, the shut-off element 3 can have a groove 20. Preferably the groove 20 is arranged on an edge between the lateral surface and the base surface 10 of the substantially cylindrical guide body 7 wherein the shut-off projection 8 is arranged on the same base surface 10.

FIGS. 18*a* and *b* show the shut-off element 3 of the valve 1 shown in FIG. 17*b*. The groove 20 of the shut-off element 3 is a tetrahedral notch which has a triangular cross-section and is arranged on the side of the substantially circular base surface 10 opposite the shut-off projection 8. The groove 20 is aligned in the direction of the longitudinal axis of the substantially cylindrical guide body 7 and projects into the base surface 10.

FIGS. 19*a* and *b* show the shut-off element 3 of a further valve 1 according to the invention. The shut-off element 3 has a shut-off projection 8 and a groove 20 having a parabolic cross-section. The groove 20 is arranged on the side of the substantially circular base surface 10 of the substantially cylindrical guide body 7 opposite the shut-off projection 8. The groove 20 is aligned in the direction of the longitudinal axis of the substantially cylindrical guide body 7 and projects into the base surface 10.

The invention claimed is:

1. A valve comprising a valve housing and a shut-off element, wherein the valve housing comprises: a cavity for receiving the shut-off element; at least one inlet opening for a fluid to flow into the cavity and one or more outlet openings for the fluid to flow out of the cavity; wherein the shut-off element comprises a guide body and is arranged linearly movably at least partially in the cavity of the valve housing; and the shut-off element comprises at least one shut-off projection for shutting off at least one of the one or more outlet openings; wherein a gap is formed in the cavity between the guide body of the shut-off element and the valve housing, through which fluid can flow and without using a seal; the gap forms a leakage flow of fluid and wherein the guide body has a groove running in the longitudinal direction of the guide body and/or that the valve housing has a groove running from an outlet opening in the direction of the at least one of the one or more inlet openings.

2. The valve according to claim 1, characterized in that the shut-off projection is arranged on a base surface of the guide body and that the groove runs to the base surface.

3. The valve according to claim 1, characterized in that the groove has a cross-section which increases continuously in the longitudinal direction of the guide body in the direction of the shut-off projection or which decreases continuously from the at least one of the one or more outlet openings in the direction of the inlet opening.

4. The valve according to claim 1, characterized in that at least two, preferably at least three outlet openings are provided, wherein the outlet openings are particularly preferably arranged in a plane perpendicular to a longitudinal axis of the cavity.

5. The valve according to claim 1, characterized in that the shut-off projection has a curved abutting surface for abutting against at least one of the outlet openings.

6. The valve according to claim 1, characterized by a drive for moving, in particular for rotating and/or linearly moving, the shut-off element.

7. The valve according to claim 6, characterized in that the drive is for rotating the shut-off element about the longitudinal axis of the substantially cylindrical guide body, wherein the drive engages at an end of the shut-off element projecting from the second aperture.

8. The valve according to claim 1, characterized in that the guide body of the shut-off element is substantially cylindrical, wherein the at least one shut-off projection is arranged on a base surface of the substantially cylindrical guide body.

9. The valve according to claim 8, characterized in that the at least one shut-off projection forms an extension of at least one part of the lateral surface of the substantially cylindrical guide body in the direction of the substantially cylindrical guide body of the shut-off element.

10. The valve according to claim 1, characterized in that the cavity is cylindrical, wherein a longitudinal axis of the cylindrical cavity coincides with the longitudinal axis of the substantially cylindrical guide body of the shut-off element.

11. The valve according to claim 10, characterized in that an inlet opening is arranged on a base surface of the cylindrical cavity, in particular is congruent with a base surface of the cylindrical cavity.

12. The valve according to claim 10, characterized in that the cavity is a cylindrical bore passing through the valve housing, wherein the cylindrical bore forms a first aperture and a second aperture on two opposite sides of the valve housing.

13. The valve according to claim 12, characterized in that the first aperture forms an inlet opening.

14. The valve according to claim 12, characterized in that a diameter of the cylindrical bore is equal to a diameter of the substantially cylindrical guide body of the shut-off element and the substantially cylindrical guide body of the shut-off element is received at least partially in the cylindrical bore in such a manner that the shut-off element projects at least partially from the second aperture.

15. The valve according to claim 1, characterized in that the valve housing has one or more further cavities, preferably wherein the one or more further cavities are cylindrical and are connected via respectively one of the outlet openings to the cavity.

16. A method for transporting fluids, characterized in that a fluid flow is regulated and/or controlled in a valve according to claim 1.

17. The method according to claim 16, characterized in that the shut-off element of the valve oscillates regularly for flushing a gap in the cavity between the valve housing and the guide body of the shut-off element.

18. A valve comprising a valve housing and a shut-off element, wherein the valve housing comprises a cavity for receiving the shut-off element, at least one inlet opening for a fluid to flow into the cavity and one or more outlet openings for the fluid to flow out of the cavity, wherein the shut-off element comprises a guide body and is arranged linearly movably at least partially in the cavity of the valve housing, and the shut-off element comprises at least one shut-off projection for shutting off at least one of the one or more outlet openings, wherein the valve has a plurality of outlet openings, wherein the shut-off projection is formed in such a manner that in at least one position in which a first of the outlet openings is shut off with the shut-off projection and the inlet opening and a second of the outlet openings are open for the flow of a fluid, an edge of the shut-off projection at least partially follows a circumference of the second of the outlet openings, wherein the valve housing is constructed and arranged for having at least one of a heated and cooled channel for regulating a temperature of the valve.

* * * * *